United States Patent
Drame

(10) Patent No.: US 9,147,166 B1
(45) Date of Patent: Sep. 29, 2015

(54) GENERATING DYNAMICALLY CONTROLLABLE COMPOSITE DATA STRUCTURES FROM A PLURALITY OF DATA SEGMENTS

(75) Inventor: Cyril Drame, Richmond, CA (US)

(73) Assignee: Konlanbi (FR)

( * ) Notice: Subject to any disclaimer, the term of this patent is extended or adjusted under 35 U.S.C. 154(b) by 144 days.

(21) Appl. No.: 13/572,352

(22) Filed: Aug. 10, 2012

Related U.S. Application Data

(60) Provisional application No. 61/522,067, filed on Aug. 10, 2011.

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| | | | |
|---|---|---|---|
| 5,029,509 | A | 7/1991 | Serra |
| 5,536,902 | A | 7/1996 | Serra et al. |
| 5,880,392 | A | 3/1999 | Wessel et al. |
| 5,886,276 | A * | 3/1999 | Levine et al. ................... 84/603 |
| 6,316,710 | B1 | 11/2001 | Lindemann |
| 7,379,873 | B2 * | 5/2008 | Kemmochi ................... 704/269 |
| 8,706,496 | B2 | 4/2014 | Sanjaume |

OTHER PUBLICATIONS

Michael Kateley Klingbeil, "Spectral Analysis, Editing, and Resynthesis: Methods and Applications", Thesis for Doctor of Musical Arts, Graduate School of Arts and Sciences, Columbia University, USA, 2009, pp. 1-157.*

Cornelia Kreutzer, Jacqueline Walker, Michael O'Neill, "Time Domain Attack and Release Modeling—Applied to Spectral Domain Sound Synthesis", Proceedings of International Conference on Signal Processing and Multimedia Applications, 2008 SIGMAP 2008, Jul. 26-29, 2008, pp. 119-124.*

Paul Masri, "Computer Modelling of Sound for Transformation and Synthesis of Musical Signals", Thsis for Doctor of Philosophy in the Faculty of Engineering, Department of Electrical and Electronic Engineering, University of Bristol, UK, 1996, pp. 1-229.*

Le Groux, S., "Perceptsynth: mapping perceptual musical features to sound synthesis parameters", Acoustics, Speech and Signal Processing, 2008. ICASSP 2008. IEEE International Conference on, Mar. 31-Apr. 4, 2008, pp. 125-128.*

Amatriain, X., et al., "Content-based Transformations", *Journal of New Music Research*, 32(1), (2003), 95-114.

Bonada, J., et al., "Synthesis of the singing voice by performance sampling and spectral models", *IEEE Signal Processing Magazine*, 24(2), (2007), 67-79.

(Continued)

*Primary Examiner* — Kakali Chaki
*Assistant Examiner* — Walter Hanchak
(74) *Attorney, Agent, or Firm* — Schwegman Lundberg & Woessner, P.A.

(57) ABSTRACT

A method of producing dynamic controllable data composites from two or more data segments includes: building or training one or more function mappers to map between one or more extracted feature envelopes sets from the original data and one or more general parametric representations of the data; combining the extracted feature envelopes or the function mappers using two or more audio segments; and feeding the extracted feature envelopes or combined feature envelopes to the function mappers to obtain synthesis parameters to drive a synthesis process.

20 Claims, 33 Drawing Sheets

(56) References Cited

OTHER PUBLICATIONS

Caetano, M., et al., "Sound Morphing by Feature Interpolation", *2011 IEEE International Conference on Acoustics, Speech and Signal Processing (ICASSP)*, May 22-27, 2011, Piscataway, NJ, USA, (2011), 161-164.

Haken, L., et al., "3, Beyond Traditional Sampling Synthesis: Real-Time Timbre Morphing Using Additive Synthesis", *In: Analysis, Synthesis and Percestion of Musical Sounds*, (2007), 122-144.

Hoffman, M., et al., "Real-Time Feature-Based Synthesis for Live Musical Performance", *Proceedings of the 7th International Conference on New Interfaces for Musical Expression (NIME97)*. New York, NY, (2007), 309-312.

Le Groux, S., "Perceptsynth: Mapping Perceptual Musical Features to Sound Synthesis Parameters", *IEEE International Conference on Acoustics, Speech and Signal Processing, ICASSP 2008*, (2008), 4 pgs.

Serra, X., "Sound Transformations Based on the SMS High Level Attributes", *Proceedings of the Digital Audio Effects Workshop*, (1998), 5 pgs.

Slaney, M., et al., "Automatic Audio Monitoring", *1996 IEEE International Conference on Acoustics, Speech, and Signal Processing Conference Proceedings*, May 7-10, 1996, New York, NY, USA, (1996), 1001-1004.

Verfaille, V., et al., "Adaptive Digital Audio Effects (A-DAFx): A New Class of Sound Transformations", *IEEE Transactions on Audio, Speech, and Language Processing*, 14(5), (2006), 1817-1831.

Verfaille, V., et al., "Mapping strategies for gestural and adaptive control of digital audio effects", *Journal of New Music Research*, 35(1), 71-93, (2006), 24 pgs.

Wessel, D., et al., "Removing the Time Axis from Spectral Model Analysis-Based Additive Synthesis: Neural Networks versus Memory-Based Machine Learning", *International Computer Music Conference, ICMC '98*, Ann Arbor, Michigan, (1998), 4 pgs.

\* cited by examiner

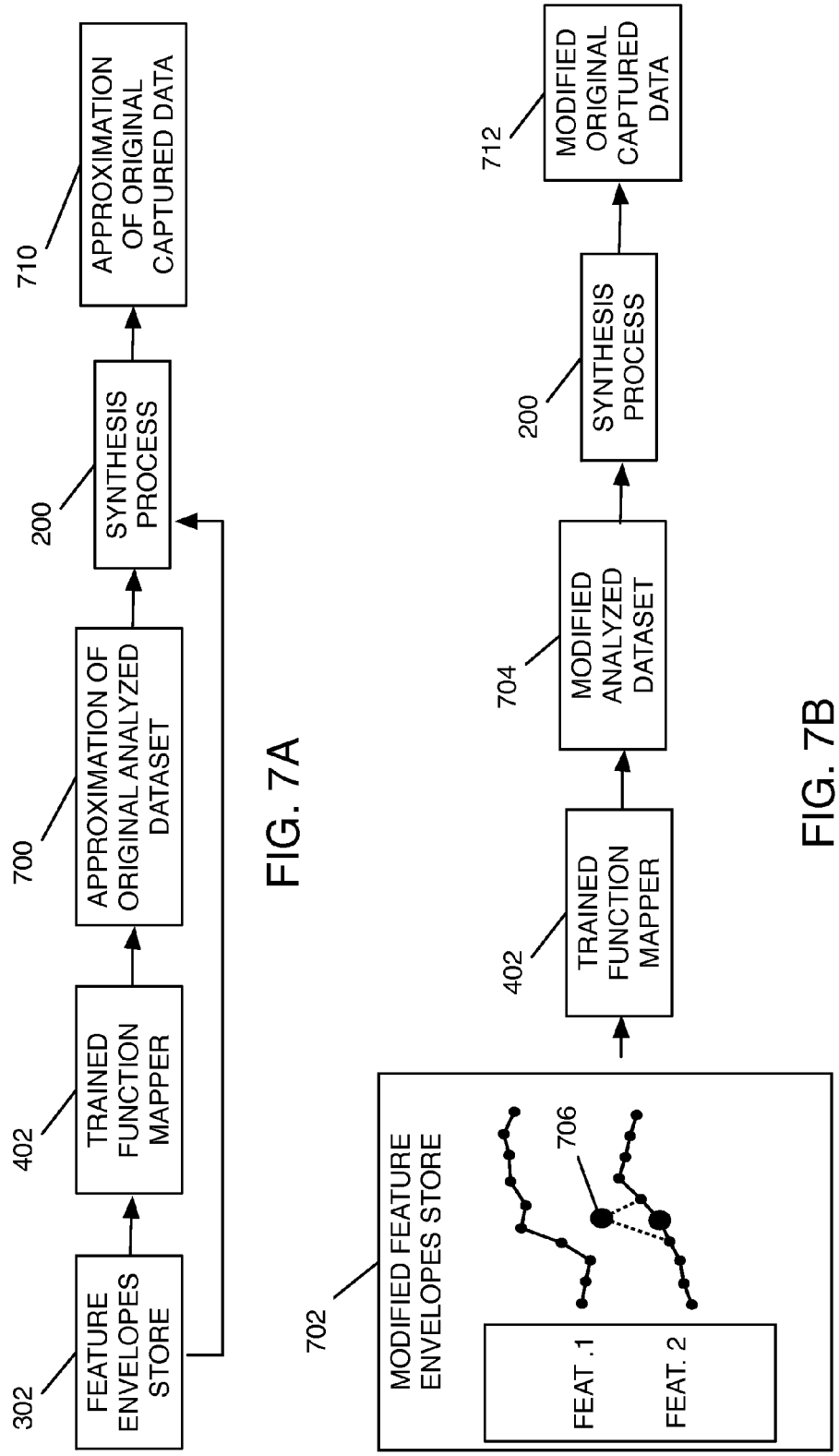

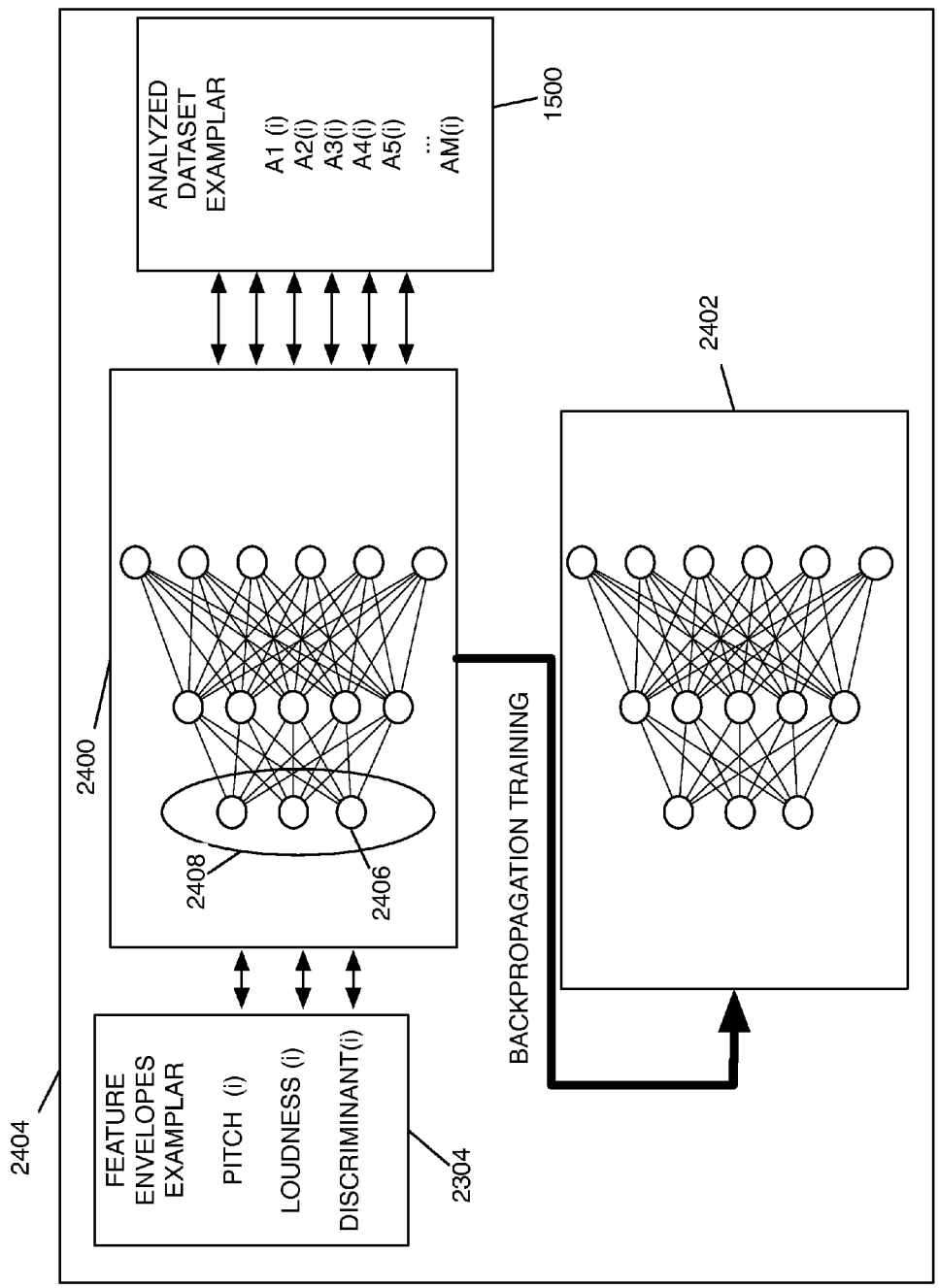

GENERATING DYNAMICALLY CONTROLLABLE COMPOSITE DATA STRUCTURES FROM A PLURALITY OF DATA SEGMENTS

CROSS-REFERENCE TO RELATED APPLICATIONS

This application claims the benefit of U.S. Provisional Application No. 61/522,067, filed Aug. 10, 2011, which is incorporated herein by reference in its entirety.

BACKGROUND

1. Technical Field

The present disclosure relates generally to computing and more particularly to combining related data segments in a computer modeling environment.

2. Description of Related Art

A variety of models relate to a full or partial representation of an object or of a process. Ideally such a representation would allow one to (1) perfectly reproduce the modeled object or process (or some of its attribute(s)) and (2), to generate (synthesize) realistic variations of it in a controlled manner.

A plethora of objects and processes have been and are being modeled on computers every day. Some examples are real world objects (like humans, animals, smoke, wind, stones, clouds, etc) specific properties (such as color textures, elasticity etc), specific behavior (such as physical motion, body motions, deformations by collisions etc), signals (such as audio, image, video signals etc), actual sound producing objects (like trumpet, car engines etc), Processes (like Highway traffic, crowd movements, weather, stock market, lightening and shadowing.) The list is almost endless.

One common issue relating to the use of most models is that of realism. Content generated by many models is often perceived as "unnatural", "unrealistic" or "produced by a computer" to various degrees. Thus, there is a need for improved modeling techniques especially when generating variations or modifications of the original data from which a model was derived.

BRIEF DESCRIPTION OF THE DRAWINGS

FIG. 7A is a block diagram illustrating the process of feeding feature envelopes to a trained function mapper to obtain an approximation of the original data.

FIG. 7B is a block diagram illustrating the process of feeding modified feature envelopes, where exemplars are modified independently, to a trained function mapper to obtain modification of the original data.

FIG. 24 is an illustration of a function mapper with discriminant inputs, and its training process.

DETAILED DESCRIPTION OF EXAMPLE EMBODIMENTS

Overview

Figure 1:
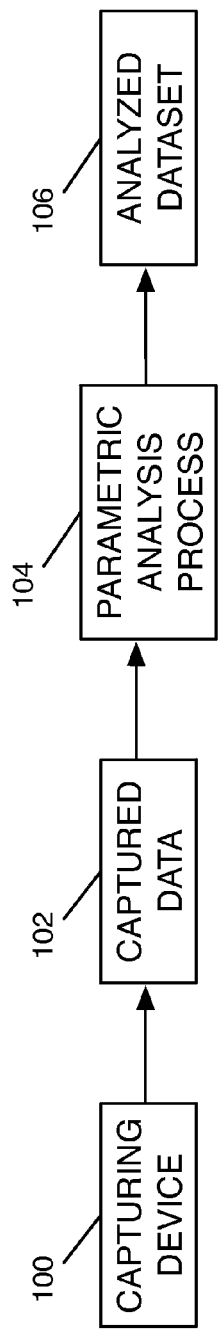
FIG. 1 is a block diagram illustrating a parametric analysis process to obtain an analyzed dataset from captured data.

Certain embodiments provide methods for generating dynamically controllable data composites from two or more data segments comprising the steps of: (1) building or training one or more function mappers to map between one or more extracted feature envelopes datasets from the original data and one or more analyzed dataset fitting one or more general parametric representation of the original data; (2) combining the extracted feature envelopes, and/or the function mappers using two or more data segments; (3) feeding the feature envelopes or combining feature envelopes to function mapper or combination of function mappers;

Certain embodiments provide methods for combining extracted feature envelopes from one or more data segments (or regions) thus ensuring more realistic features parameters correlations across exemplars.

Certain embodiments provide methods for training a single function mapper with a discriminant input on two or more data segments thus in effect combining the functionalities of two separate function mappers trained on two different data segments and thus obtaining a combined function mapper.

Certain embodiments provide methods for combining two or more function mappers in parallel where function mappers are fed with two or more matched feature envelopes segments, extracted from two or more data segments, and further combining the function mappers at their outputs levels Certain embodiments provide certain methods described above where the data to be modeled is captured audio data.

Certain embodiments provide certain methods described above where the general representation is a succession of Short Term Discreet Fourier Transforms such as described in SMS.

Certain embodiments provide certain methods described above where the function mapper is a multilayer perceptron neural network trained using a backpropagation algorithm and a magnitude-based perceptual weighting function.

Certain embodiments provide methods for combining new feature envelopes and/or function mappers outputs using information present in the original data.

Certain embodiments provide means to combine one segment or more segments with additional segments which are not extracted from the data but can be defined explicitly as mathematical functions such as a warping function.

Certain embodiments provide means to combine one or more segment with additional segments which are not extracted computationally from the data but which are extracted perceptually by a human assessing perceptual values or properties by way of a graphical editor for instance.

Certain embodiments provide means to modify label values inputs at synthesis time.

Certain embodiments provide methods to generate models that map extracted feature envelopes to analyzed datasets using a function mapper, and a magnitude based weighting function for training the function mapper.

Certain embodiments provide certain methods described above where the data to be modeled is captured body motion data.

Certain embodiments provide certain methods described above where the data to be modeled is captured image texture data.

Certain embodiments provide a client-server architecture where the control parameters and/or the parameters to generate new envelopes and/or actual synthesis parameters are transmitted remotely.

Certain embodiments provide ways of applying a subset of this modeling technique to fields other than audio and texture (for instance to body motion synthesis).

Certain embodiments provide various improvements of a subset of this modeling technique as applied to audio synthesis.

Certain embodiments provide control over other types of synthesis than purely harmonic audio synthesis.

Certain embodiments include spectral and temporal 3d audio manipulations

Certain embodiments provide timbre-space control structure which includes not only the spectral but also temporal characteristics of timbre.

Certain embodiments provide methods for using yet other function mapper(s) to further reduce control parameter space dimensionality.

Introduction

Modeling techniques are numerous and the same technique can often be found to apply across different application fields. For instance, one can find concatenative models in fields including audio modeling, texture modeling, and body-motion modeling. Concatenative modeling consists in storing a database of captured data and using a search algorithm to pick the appropriate pieces of data to concatenate at synthesis time. As another example, physical modeling which consists in using the underlying physical laws governing the object or process to be modeled, can be found in many application fields as well. In general modeling techniques exhibit the same advantages and disadvantages across all application fields. For instance with concatenative techniques, transitions at junction of two pieces of data to concatenate are usually problematic and sources of artifacts.

Data driven parametric modeling is one common type of data modeling technique. It consists in estimating a set of parameters from some captured original data in accordance with a predetermined general representation. The estimated set of parameters obtained at this Analysis stage, can be stored as a new dataset (analyzed dataset) on which modifications can then be performed.

In order to reproduce the original data, the analyzed dataset is fed back to a synthesizer that performs the inverse operation corresponding to the analysis. In order to produce variations or modifications of the original data, the analyzed dataset is first modified before being fed to the synthesizer.

Analyzed datasets obtained in traditional parametric techniques are usually of high dimensionality. This means that the number of parameters on which modifications have to be applied to obtain variations is usually high. This makes it difficult at modification time to preserve natural correlations between the numerous parameters and hence those modeling techniques often produce perceptually non-natural data at synthesis time especially for complex modifications. The high dimensionality of the analyzed dataset also means that traditional parametric techniques often need to store lots of data. This makes such techniques difficult to use in environments where low footprint is required or desired such as mobile phones or video games for instance. Efforts to both reduce dimensionality and preserve correlations in the modified analyzed dataset, have occurred in the art especially in the audio field for instance or texture synthesis field.

These techniques reduce the dimensionality of the analyzed dataset by building or training a function mapper to map feature envelopes extracted from the original data to its corresponding analyzed dataset. They address the correlation issue exemplar by exemplar but the modification methods that they provide usually modify exemplars independently from each other and values that are part of an exemplar independently from each other as well. They usually do not provide methods to modify exemplars by using other exemplars. Thus the modification methods provided by these techniques usually only allow simple perceptually natural modifications (such as loudness, brightness control or pitch/time extrapolations in audio applications for instance). However, the problem of preserving natural correlations between different exemplars and across feature envelopes remains unaddressed and hence these techniques do not provide mechanisms to generate complex modifications such as generating perceptually natural new data based on two or more data segments.

Another effort to address the correlation issue in data-driven parametric modeling includes blending or interpolating analyzed parameters from two different analyzed datasets. This technique is typically encountered in body motion modeling or audio morphing for instance. These techniques however do not usually use a function mapper between extracted feature envelopes and analyzed dataset. They usually need to keep a stored version of the analyzed dataset and thus are often difficult to use at synthesis time in low footprint environments.

Yet other techniques in audio use extracted features envelopes or combination of feature envelopes to control known audio effects such as time stretching or reverbs. These methods aim to control traditional audio effects in a dynamic way. They usually use explicit mapping schemes.

Generally Applicable Embodiments

FIG. 1 illustrates a parametric analysis process performed on captured data 102 to obtain an analyzed dataset 106. The captured data 102 may come from a capturing device 100 or from any other source such as another synthesis process. Examples of captured data to be modeled include audio samples, motion capture samples, texture bitmaps, statistic distributions, and other processes. The data is then passed to a parametric analysis process 104 (or analysis for synthesis process), which includes estimating a set of parameters from the original captured data 102 in accordance with a predetermined general representation. The estimated set of parameters (or synthesis parameters) obtained at this analysis stage, are stored as an analyzed dataset 106.

One example of such parametric analysis and general representation is Spectral Modeling Synthesis (SMS), where the chosen general representation is a succession of Short Term Fourier Transform of the signal. Other examples of parametric analysis include wavelet-based analysis, LPC (Linear Predictive Coding (LPC) analysis, Perlin noise modeling, and the like. Examples of other general representations often used in parametric analysis/synthesis techniques include wavelet transforms as used in image synthesis or motion synthesis, for example, Hidden Markov Models (HMMs), and rigid-body skeleton analysis.

Examples of synthesis parameters extracted from the data to fit a general description include: Fourier transform coefficients or approximations such as spectral peaks, wavelets coefficients, transition probability densities, articulation joints positions and angles etc. The process of estimating or directly acquiring parameters to fit a general representation (like in body motion data capture and skeleton general representation) can also be referred to as parametric analysis.

The analyzed dataset 106 contains the synthesis parameters necessary to re-synthesize the original data or an approximation of the original data. Analyzed datasets are typically organized according to analyzed parameter exemplars (or synthesis parameter frames) that capture evolutions or variations of the synthesis parameters (e.g., analyzed dataset exemplar 504 in FIG. 5). Such evolutions are not necessarily temporal, they can relate to time, to space or to other types of relevant dimensions. Analyzed dataset exemplars (or synthesis parameter frames) can be one-dimensional or multi-dimensional depending on the particular data and general representation chosen.

Figure 2:
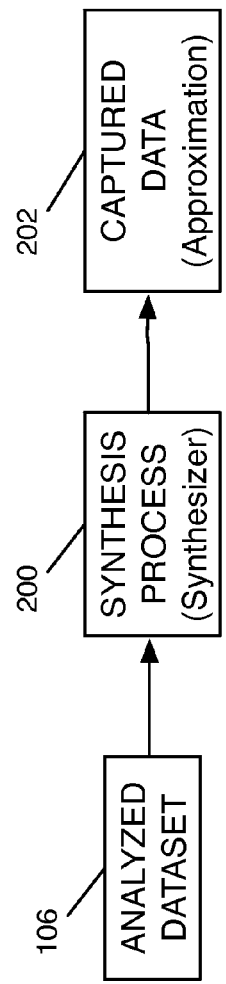
FIG. 2 is a block diagram illustrating a re-synthesis process from the analyzed dataset.

FIG. 2 Illustrates a re-synthesis process performed by feeding the analyzed dataset 106 as synthesis parameters to a synthesis process 200 (or synthesizer) that performs the inverse operation of analysis process 104. The result of this synthesis process is an approximation 202 of the original captured data 102. If the original data to be modeled is audio data then the approximation 202 is an approximation of the original audio, if the original data is body motion captured data then the approximation 202 is an approximation of the body motion captured data, if the original data is a texture image then the approximation 202 is an approximation of the texture image, etc.

Figure 3:
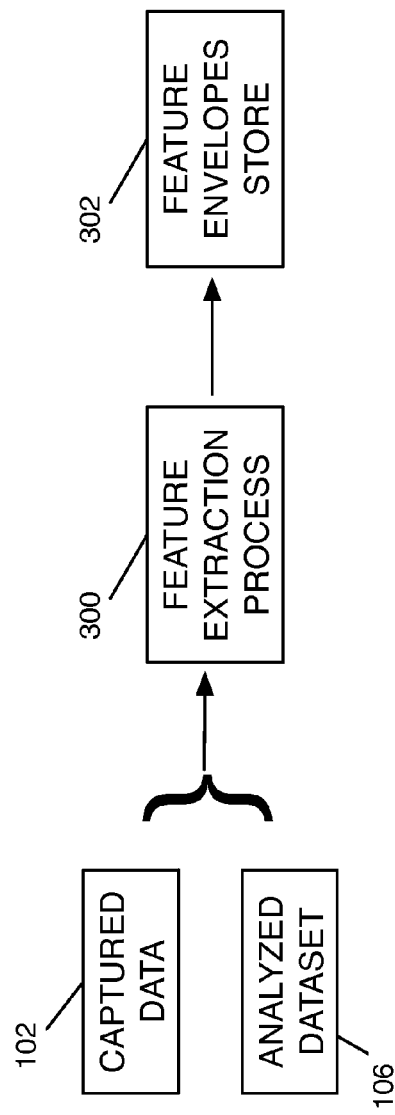
FIG. 3 is a block diagram illustrating a feature envelopes extraction process.

FIG. 3 illustrates a feature extraction process 300. Feature envelopes can be computed from the analyzed dataset 106 (or synthesis parameters), or directly from the captured data 102 or both, or manually assigned using a graphical editor for instance. Examples of feature extraction processes include: Pitch detection, loudness estimation, Mel-Frequency Cepstral Coefficient (MFCC) estimation, Root joint position movements direction estimation or acquisition, global velocity estimation or acquisition. The output of the feature extraction process 300 is saved in a feature envelope store 302.

Figure 4:
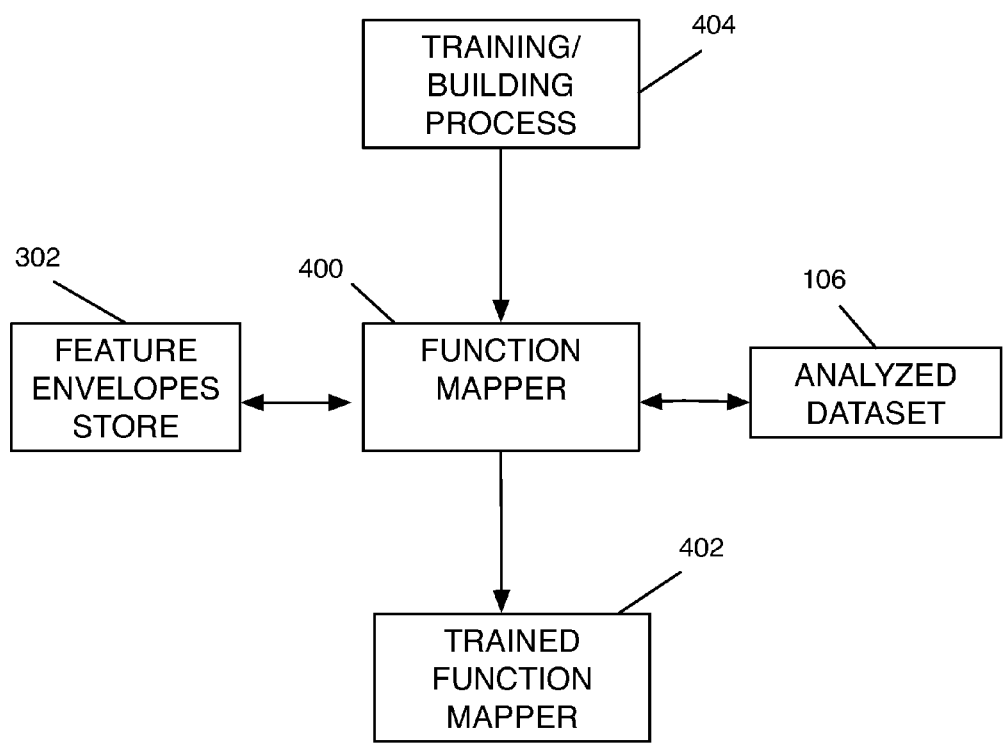
FIG. 4 is a block diagram illustrating a process of building a function mapper between extracted feature envelopes and analyzed dataset.

FIG. 4 is a block diagram illustrating a training or building process 404 for a function mapper 400 based on extracted feature envelopes stored in a features envelope store 302 and an analyzed dataset 100 to produce a trained function mapper 402. Any transform can be applied to extracted features to derive even more features envelopes. For example N-order derivatives and or delay lines can be applied to a specific feature envelope to obtain yet another feature envelope to present to the function mapper 400 shown in FIG. 4. Such transforms can also be applied to analyzed datasets. Feature envelopes are organized as successions of feature envelopes exemplars (or feature envelopes frames, or feature vectors). Feature envelopes exemplars may include one-dimensional or multi-dimensional sets of values. They can be computed from analyzed dataset exemplars and/or directly from the data to be modeled. Successions can relate to time, space or other relevant dimensions according to the data to be modeled and to the specific application.

The function mapper establishes a correspondence (or mapping) between the extracted features envelopes in the feature envelopes store 302 and the analyzed dataset 106 or a subset of the analyzed dataset 106. The function mapper 400 typically has extrapolation and/or interpolation capabilities. Such a function mapping can be achieved by many techniques including neural networks (NN), support vector machines (SVM), memory-based techniques, and a wide variety of other techniques common in the field of modeling. Techniques can be parametric like neural networks or SVMs where a fixed number of parameters are fit to the original data during a training or building process 404, or non-parametric like in-memory-based techniques where the number of parameters varies with the amount of data. These techniques can be adaptive or not, feeding some or all outputs back into the inputs or not.

Certain embodiments disclosed herein include a Multilayer Feedforward Perceptron (MLP) neural network as a function mapper 400. Those skilled in the art will appreciate that alternative function mapping techniques may be used.

In accordance with one embodiment, a multilayer feedforward perceptron neural network is used as a function mapper 400. Neural networks can be considered as representatives of a broad class of adaptive function mappers and have been shown to be universal function approximators. Moreover, neural networks are known for their interpolation and extrapolation properties. Another advantage is that neural networks can be very compact in term of memory usage and very fast in terms of Central Processing Unit (CPU) usage and are therefore suitable for embedded applications.

Figure 5:
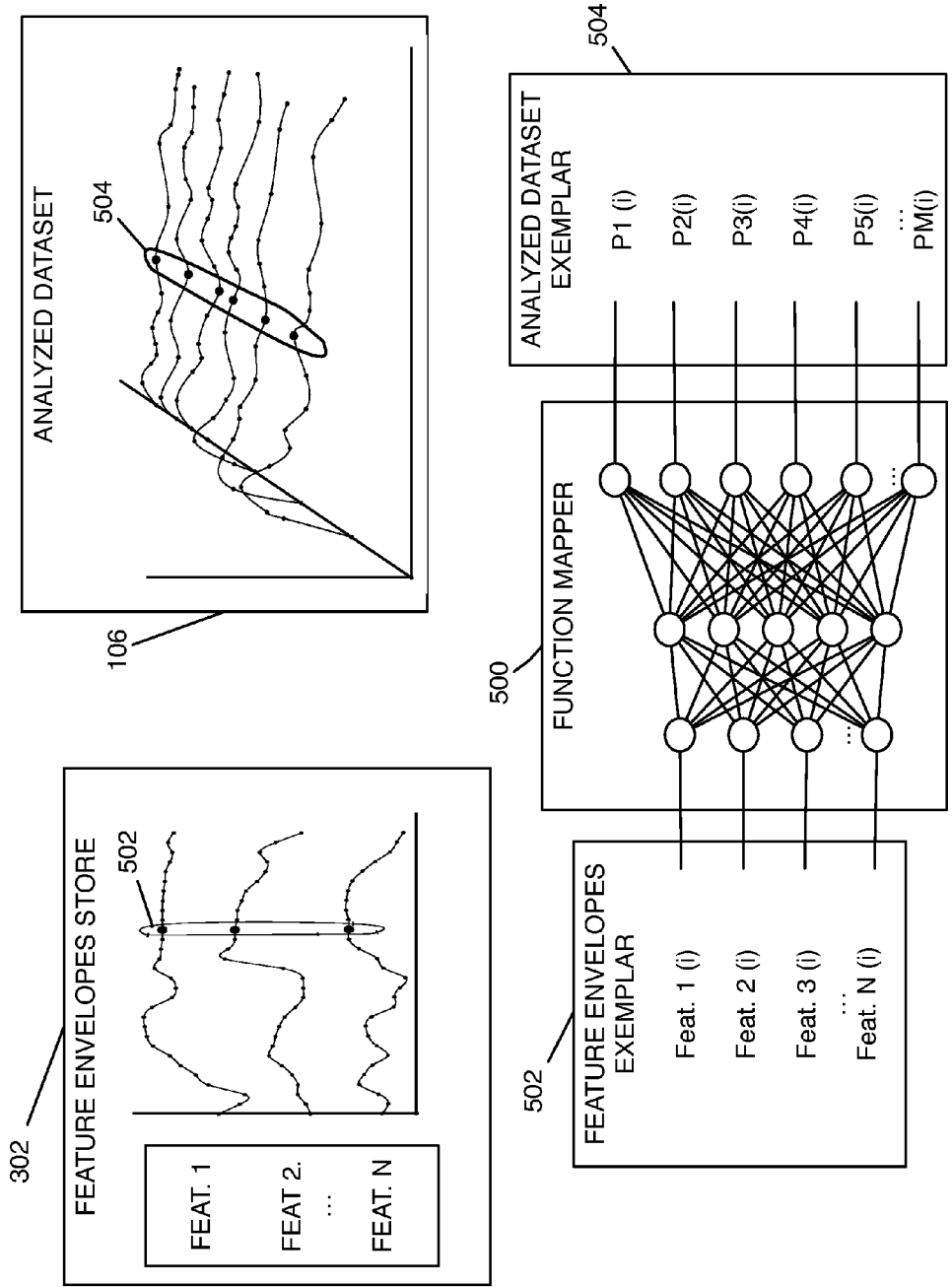
FIG. 5 further illustrate the process of building a function mapper between extracted feature envelopes and analyzed dataset, where the function mapper is a Multi-layer perceptron neural network (MLP).

FIG. 5 shows a feed-forward Multilayer Perceptron (MLP) neural network used as a function mapper 500 according to one embodiment. In this embodiment the neural network is trained with a standard backpropagation-type algorithm. The input patterns are feature envelope exemplars 502 (or feature envelope frames) and the output patterns are analyzed dataset exemplars 504 (or synthesis parameters frames). Both the feature envelope exemplars 502 (or frames) and analyzed dataset exemplars 504 (or frames) can be one-dimensional or multi-dimensional depending on the application. Input patterns for an index i may include input frames at i-1, i-2, ... i-n and/or i+1, i+2, ... i+n.

During this training (or design) stage, feature envelope exemplars 502 are presented at the input of the function mapper 500 and the corresponding analyzed data exemplars 504 are presented at the output of the MLP as the desired outputs to be learned. Dataset normalizing techniques common in the neural network field, are applied at training time to the feature envelope dataset and the analyzed dataset. As noted in FIG. 5, the feature envelope exemplars 502 may also correspond to the previously discussed feature envelopes store 320, and the analyzed data exemplars 504 may also correspond to the previously discussed analyzed dataset 106.

Figure 6:
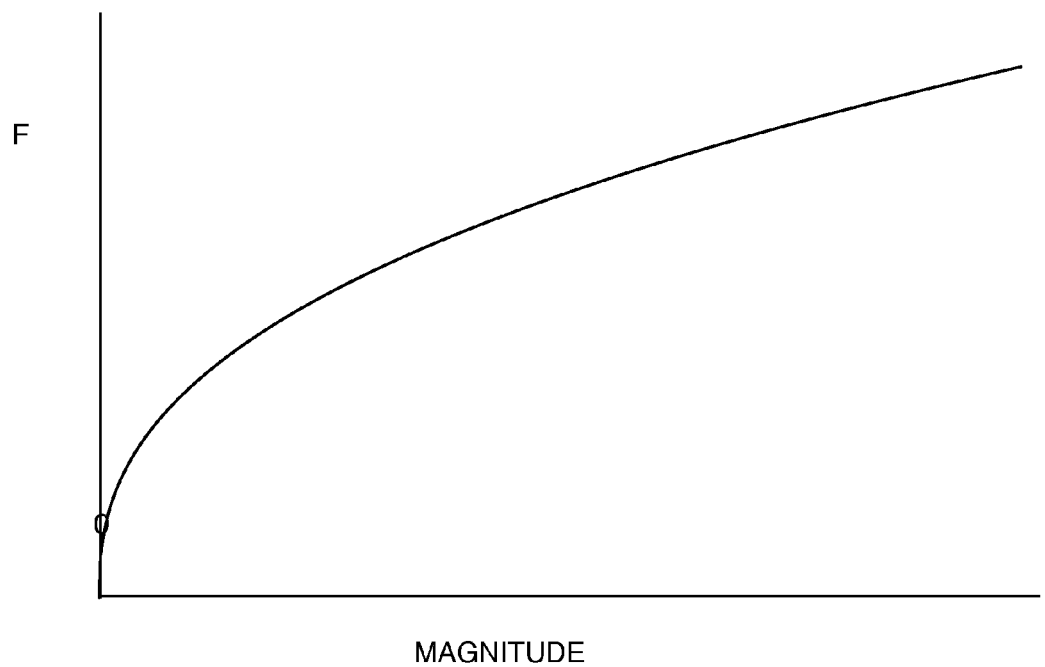
FIG. 6 is an example of a magnitude dependent weighting function that can be used for function mapper training.

FIG. 6 is an example of a magnitude dependent weighting function that can be used for function mapper training. At this training (or design) stage and depending on the modeled data, the target application, and the type of function mapper used, a magnitude weighting (or normalizing) function F such as the one shown in FIG. 6 can be applied to analyzed dataset or feature envelopes or both during learning to ensure that all parts of the data are given an equivalent weight (i.e., values of same order of magnitude at the outputs of the function mapper). When such a function is used at training stage as a normalization function, the inverse function is then applied at synthesis stage to the outputs (or inputs or both) of the function mapper.

FIG. 7A is a block diagram illustrating the process of feeding feature envelopes from the feature envelope store 302 to a trained function mapper 402 to obtain an approximation of the original captured data 710 through an approximation of the original analyzed dataset 700 and a synthesis process 200. Once the function mapper 400 has been built or trained, re-synthesis is achieved by feeding the original feature envelopes 302 as inputs to the trained function mapper 402 to obtain an approximation of the original analyzed dataset 710 (or synthesis parameters). The generated approximation of the original analyzed dataset 700 (or approximation of synthesis parameters) is fed to the synthesizer 200 to perform synthesis process and obtain an approximation of the original data.

The function mapper's outputs can represent all the synthesis parameters needed for synthesis process 200, or only a subset of these parameters. If the function mapper's outputs represent only a subset of the parameters needed for synthesis then other information such as information from the feature envelope store 302 might be needed at synthesis time to produce the full synthesis parameter frames needed by the synthesizer. In that case, the synthesis process 200 includes a pre-processing stage where the missing parameters are generated. Related aspects will be described below with reference to certain embodiments.

FIG. 7B Is a block diagram illustrating the process of feeding modified feature envelopes from a modified feature envelope store 702, where exemplars are modified independently, to a trained function mapper to obtain modification of the original data. As shown in FIG. 7B, a trained function mapper 402 is used to produce a modified analyzed dataset 704, which is fed to a synthesis process 200 to produce modified original captured data 712. One advantage of using a function mapper is using its interpolation and extrapolation capabilities to perform synthesis of new data by using feature envelopes that are different from the original extracted ones. When new envelopes are fed as inputs, the function mapper interpolates and or extrapolates new synthesis parameters while preserving some degree of original correlation amongst the synthesis parameters exemplar by exemplar.

In FIG. 7B, Feature envelope #2 is modified independently of feature envelope #1. This modification thus is not respecting natural relationships (or cross-correlations) between feature envelope #1 and feature envelope #2. Also the only modified value 706 is modified independently from the neighboring values in feature envelope #2. This modification thus is not respecting natural relationships between values in the same feature envelope (or auto-correlations). Therefore, this type of modification may produce a perceptually non-natural result especially if the modification is important and if many exemplars are modified in this manner. For example, if the data being modeled is audio data, the produced variation will likely sound unnatural as if "coming from a computer", and if the data to be modeled is body motion, then the modified motion will likely look unnatural, and so on.

Figure 8A:
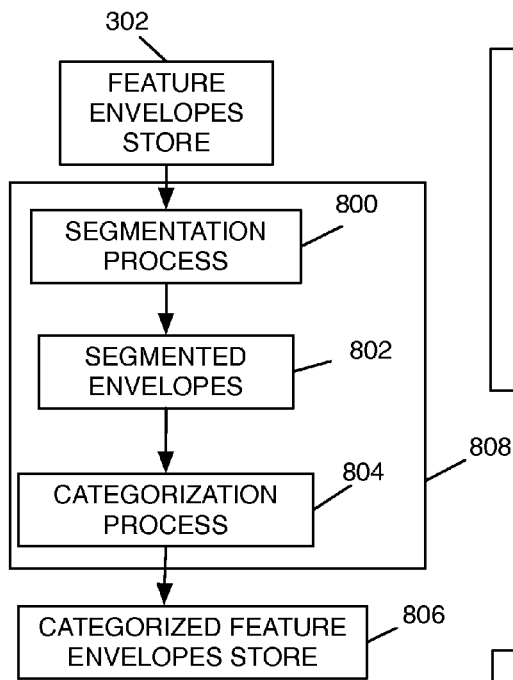
FIG. 8A is a block diagram illustrating a process of segmenting and categorizing feature envelopes.

FIG. 8A is a block diagram illustrating a process of segmenting and categorizing feature envelopes form a feature envelopes store 302 including a segmentation process 800 to produce segmented envelopes 802 and a categorization process 804 to produce a categorized feature envelopes store 806. The segmentation process 800 consists in manually or automatically finding or assigning boundaries to the feature envelopes and or the original dataset so as to identify segments (or regions). Depending on the type of data to be modeled, segmentation can be performed automatically when segmentation algorithms are available in the field (ex: audio segmentation or image segmentation) or manually using a graphical editor like in body motion for instance. The categorization process 804 consists in automatically or manually assigning categories or labels to different segments (or regions). Categories can be integers or names corresponding to specific characteristics of the segment.

The results of the segmentation/categorization processes 808 of FIG. 8A in the categorized feature envelopes store 806 include information defining the boundaries of the segment, and one or more labels to assign one or more categories to the segment. Boundaries can relate to time if the data to be modeled are timed (e.g., for audio, or body motion) or space (e.g., for image texture) or to other dimensions relevant to the specific type of data being modeled and to the specific application. This information can be stored together with the corresponding feature envelope in the categorized feature envelopes store 806.

Figure 8B:
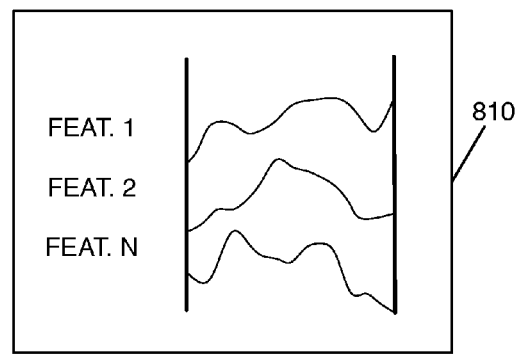
FIG. 8B shows an example of a feature envelope segment.
Figure 8C:
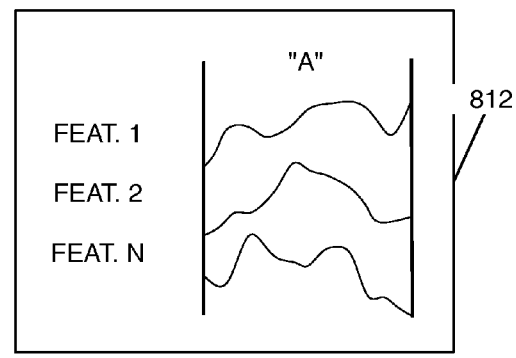
FIG. 8C shows an example of a categorized feature envelope segment.

FIG. 8B shows an example of a feature envelope segment 810. Feature envelopes can be multi-dimensional or one-dimensional. In this particular case the feature envelopes segment 810 includes 3 one-dimensional feature envelopes with boundaries. FIG. 8C shows an example of a categorized feature envelope segment 812 (or annotated feature envelope store). In this particular case the categorized feature envelope segment 812 includes a feature envelope segment and one category (or label, or annotation). The category in this particular case is simply the letter "A", but it could be a name or a number for instance. Multiple categories can be assigned to a single segment.

As discussed below in greater detail, certain embodiments include a modeling stage and a synthesis stage. The modeling stage may include operations for training and building a model including: (a) operations for parametric analysis on original data to obtain an analyzed dataset; (b) operations for Feature extraction, segmentation and categorization; (c) operations for building or training one or more function mappers to map between extracted features and analyzed dataset (e.g., function mappers can possibly be trained or built to combine properties of two or more segments using a discriminant input); and (d) operations for designing and choosing generative rules and combination processes. The synthesis stage may include: (a) operations for feeding inputs (possibly including combined inputs) to one or more function mappers (possibly including function mappers trained or built to combine properties of two or more segments); and (b) operations for feeding output of the function mappers to a synthesis process. As discussed below in greater detail, a combination of two or more segments may occur at various places including the function mapper's input level, the function mapper's body level, the function mapper's output level, or some combination of these levels.

Figure 9:
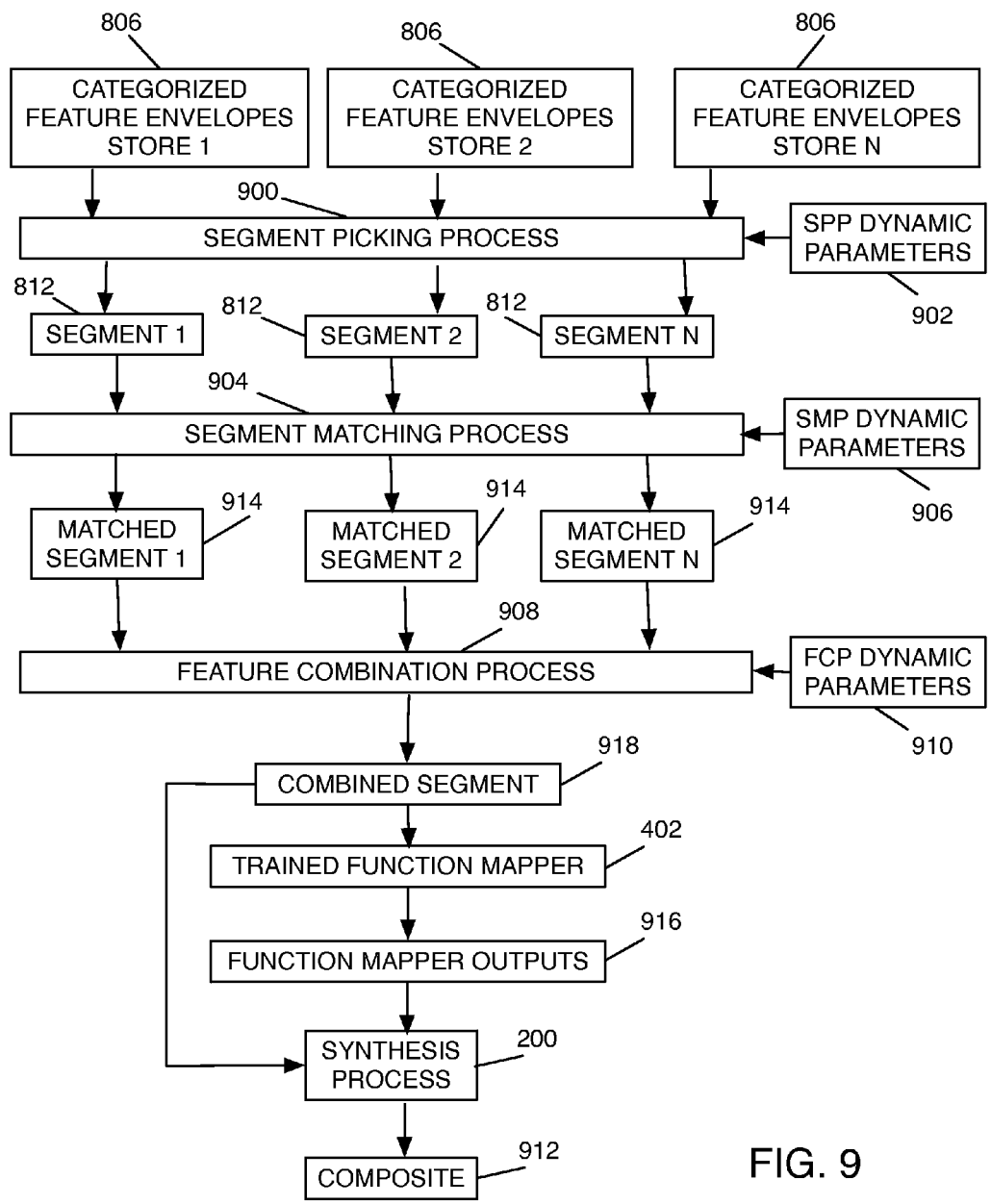
FIG. 9 illustrates a process of combining two or more segments at the function mapper's input level.

FIG. 9 illustrates an example embodiment of a synthesis stage that combines two or more segments at the function mapper's input level. The segment picking process 900 includes picking one or more feature envelope segments from one or more categorized feature envelopes datasets (or stores) 806 to determine segments 812. The rules and methods for segment picking including segment picking process (SPP) dynamic parameters 902 can be chosen or designed at design time. Examples of segment picking rules include, for example, random picking, manual picking, or rules such as "pick the first segment of one dataset and the first segment of a second dataset, then pick the second segment of the first dataset and the second segment of the second dataset etc." As another example a rule can be "pick segments that fit a pre-determined statistic distribution."

A segment matching process 904 includes modifying or matching two or more feature envelope segments 812 so that they can be further combined. The rules and methods for segment matching including segment matching process (SMP) dynamic parameters 906 can be chosen or designed at design time. For example, if the segments 812 relate to time, then one matching process may include stretching or interpolating or extrapolating the segments envelopes so that the different segments have the same chosen duration. If the segments relate to space for instance, then one matching process may include modifying the segments so that their spatial boundaries match.

A feature combination process 908 or feature envelopes segment combination process includes generating a combined segment 918 that provides a new feature envelopes segment based on two or more feature envelopes segments. The rules and methods for feature combination including feature combination process (FCP) dynamic parameters 910 can be chosen or designed at design time. One example of feature combination process is linear combination of two or more feature envelope segments as will be described later in this document. Other examples are non-linear combinations of one or more segments; using statistical properties of one or more segments to generate or modify a segment etc. A feature envelopes segment can also be explicitly generated from mathematical formulas (like a warping functions for instance) to compute its envelopes and then be combined with one or more other feature envelope segments.

The segment picking process 900, the segment matching process 904, and the feature combination process 908 are examples of generative rules or combining rules (or methods and rules for generating new feature entries by using the extracted features and or other information contained in the data and/or other subjective information so that the new generated features entries respect the natural correlations and/or other properties of the original extracted features.) As discussed above, these generative rules may have dynamic parameters to change and control their behavior, and these rules together with methods for changing or generating these dynamic parameters may be designed at the design stage.

As discussed above, an example of synthesis stage combining two or more segments at the function mapper's input level is described in FIG. 9. A corresponding synthesis method includes: performing a segment picking process 900 to pick two or more segments from feature envelopes stores 806; performing the segments matching process 904 to obtain matched segments 914; applying the feature combination process 908 to the time-matched segments to obtain the combined segment 918; feeding the combined segment 918 to the trained function mapper 402; feeding the function mapper's outputs 916 to the synthesis process 200. The function mapper's outputs 916 can be a single frame (or exemplar) of outputs resulting from feeding one input feature envelope exemplar from the combined segment 918 to the function mapper. In that case this outputs frame can be fed directly to the synthesis process without waiting for further input feature envelope exemplar to be fed to the trained function mapper 402 or for output exemplar to be produced.

If the function mapper's outputs 916 represent only a subset of the parameters needed for synthesis then other information such as information from combined segment 918 exemplar(s) might be needed at synthesis time to produce the full synthesis parameter frames needed by the synthesizer. In that case the synthesis process can include a pre-processing stage (or synthesis parameters reconstructive stage) that reconstructs the missing parameters for synthesis process when given necessary information. Necessary information can come for instance from the combined segment 918 exemplar(s). In that case the combined segment 918 exemplar(s) can be fed to the synthesis process to generate the missing parameters. This will be further described below with reference to certain embodiments.

Finally the method of FIG. 9 obtains a composite 912 (e.g., a composite data structure) of two or more segments 812. For example, composites can be audio-composites if the data modeled is audio data. In that case an audio-composite segment will be a new audio segment inheriting some properties from two or more original audio segments. Composites can be body-motion-composites if the data modeled is body-motion data. In that case the body-motion composite segment will be a new body-motion segment inheriting some properties from two or more original body-motion-segments. Composites can be texture composites if the data modeled is image texture data. In that case the texture-composite segment will be a new texture segment inheriting some properties from the two or more original texture segments etc. Composites can also be created across different types of data where feature envelopes segments from data of one type (audio for instance) are combined to feature envelopes segments from data of another type (body motion for instance).

Figure 10A:
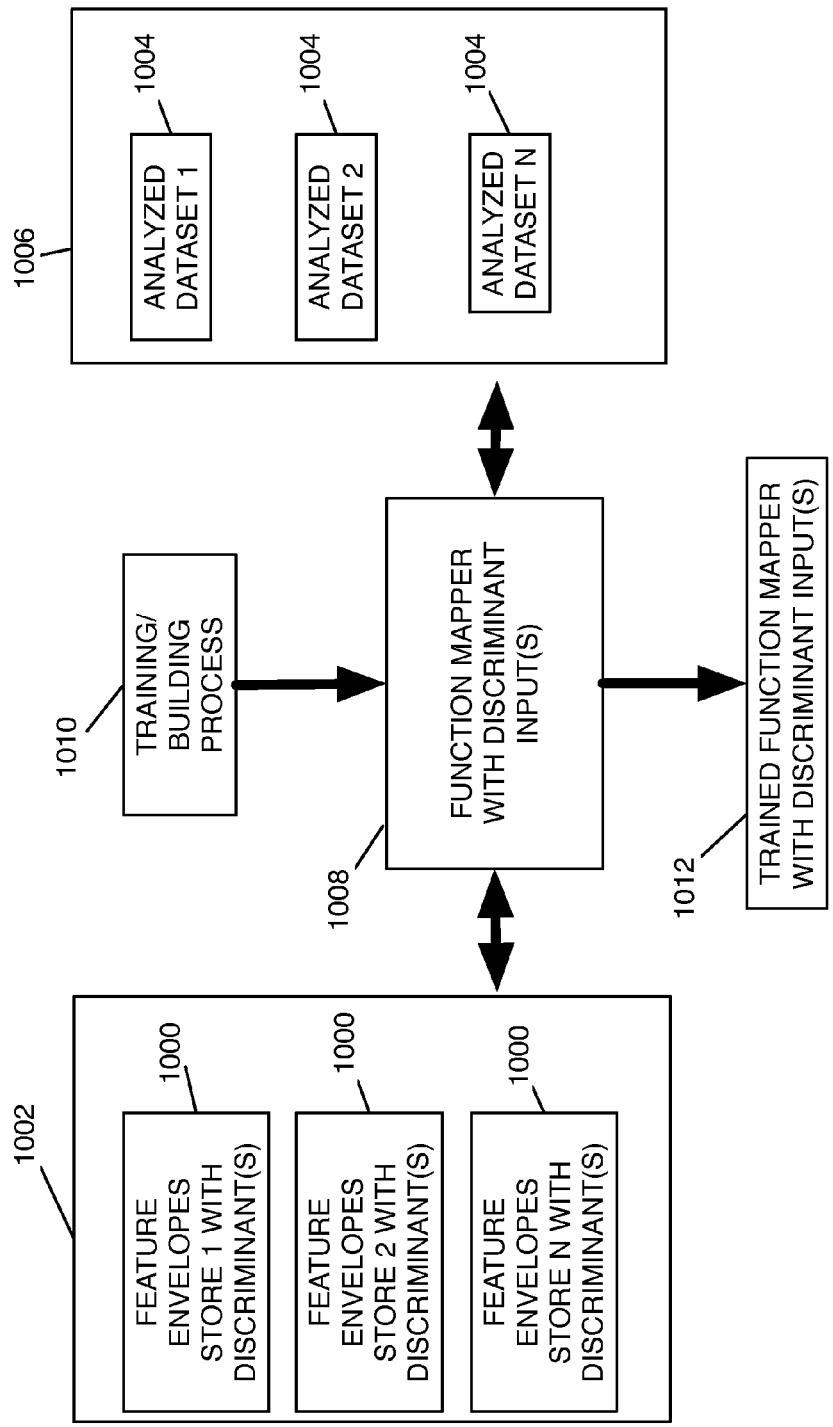
FIG. 10A illustrates the training stage of a process of combining two or more segments at the function mapper's body level using discriminant inputs.

FIG. 10A illustrates the training (or design) stage of a process of combining of two or more segments at the function mapper's body level using discriminant inputs from a combined feature envelope store 1002 that includes a plurality of feature envelopes with discriminants 1000. Discriminant inputs allow one to teach a function mapper to discriminate between specific properties of the data in different segments in order to control these properties. Using discriminant inputs can be viewed as a reverse process of traditional pattern recognition common in the art. At the training stage, the discriminant input value specifies to the function mapper what property it is learning. Then at the synthesis stage, the discriminant input value can be changed in order to cause the function mapper's interpolation/extrapolation capabilities to interpolate between the specific properties controlled by the discriminant input. This will be further described below with reference to certain embodiments.

Discriminants (or values assigned during the labeling process or values perceptually extracted manually by a human, as inputs for the function mapper both at design time and at synthesis time) can be manually assigned using a graphical editor for example. Some extracted features envelopes can be used as discriminant envelopes if these extracted features envelopes exhibit mostly different values in regions where the data is different with regards to the property to be controlled (or discriminated). This will be further described below with reference to certain embodiments.

In FIG. 10A, the training process of a function mapper with discriminant inputs 1008 is illustrated. Feature envelope stores #1, #2 and #N 1000 have different properties that can be discriminated by discriminant inputs. During training/building process 1010 feature envelopes store #1 1000, which includes one or more discriminant inputs (or values assigned during the labeling process or values perceptually extracted manually by a human, as inputs for the function mapper both at design time and at synthesis time) is mapped to analyzed dataset #1 1004. Feature envelope store #2 1000 including one or more discriminant inputs is mapped to analyzed dataset #2 1004 and so on. At training time feature envelope stores 1000 can be combined or joined together in a single feature envelopes dataset (or store) 1002 and analyzed datasets can be combined or joined as well to form a single analysed dataset 1006.

The resulting trained function mapper with discriminant inputs 1012 combines properties from all the different feature envelope stores and analyzed datasets it has been trained or built with. The discriminant inputs enable interpolation and extrapolation between the chosen properties at synthesis stage. This will be further described below with reference to certain embodiments. This process of building a function mapper with discriminant inputs is an example of combination of two or more segments at the function mapper's body level. This will be further described below with reference to certain embodiments.

Figure 10B:
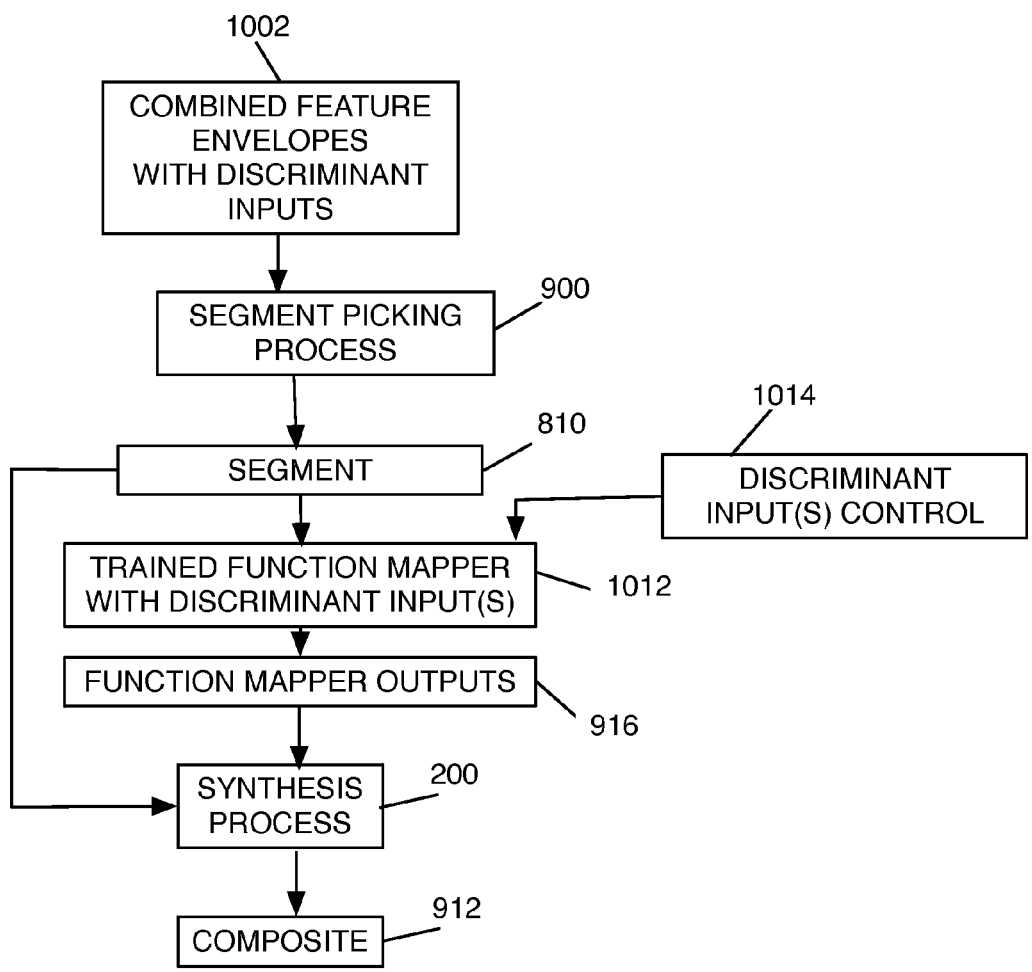
FIG. 10B illustrates the synthesis stage of a process of combining two or more segments at the function mapper's body level using discriminant inputs.

FIG. 10B illustrates the synthesis stage of a process of combining two or more segments at the function mapper's body level using discriminant inputs. With reference to FIG. 10A, the trained function mapper with discriminant inputs 1012 is now able to interpolate/extrapolate according to the discriminant property. According to the segment picking process 900, one or more segments 810 are picked from one of the combined feature envelope stores 1002 for instance and extracted features are fed to the trained function mapper with discriminant inputs 1012. The function mapper's outputs 916 are fed to the synthesis process 200. If the function mapper's outputs 916 represent only a subset of the parameters needed for synthesis, then picked feature segment 810 exemplars can be fed to the synthesis process 200 to generate the missing parameters. This will be further described below with reference to certain embodiments. As a final result in FIG. 10B, composite 912 is generated.

When varying discriminant inputs values through discriminant input control 1014, the discriminant property will also change at the outputs of the trained function mapper and hence in the composite 912 as well. This will be further described below with reference to certain embodiments.

Figure 11:
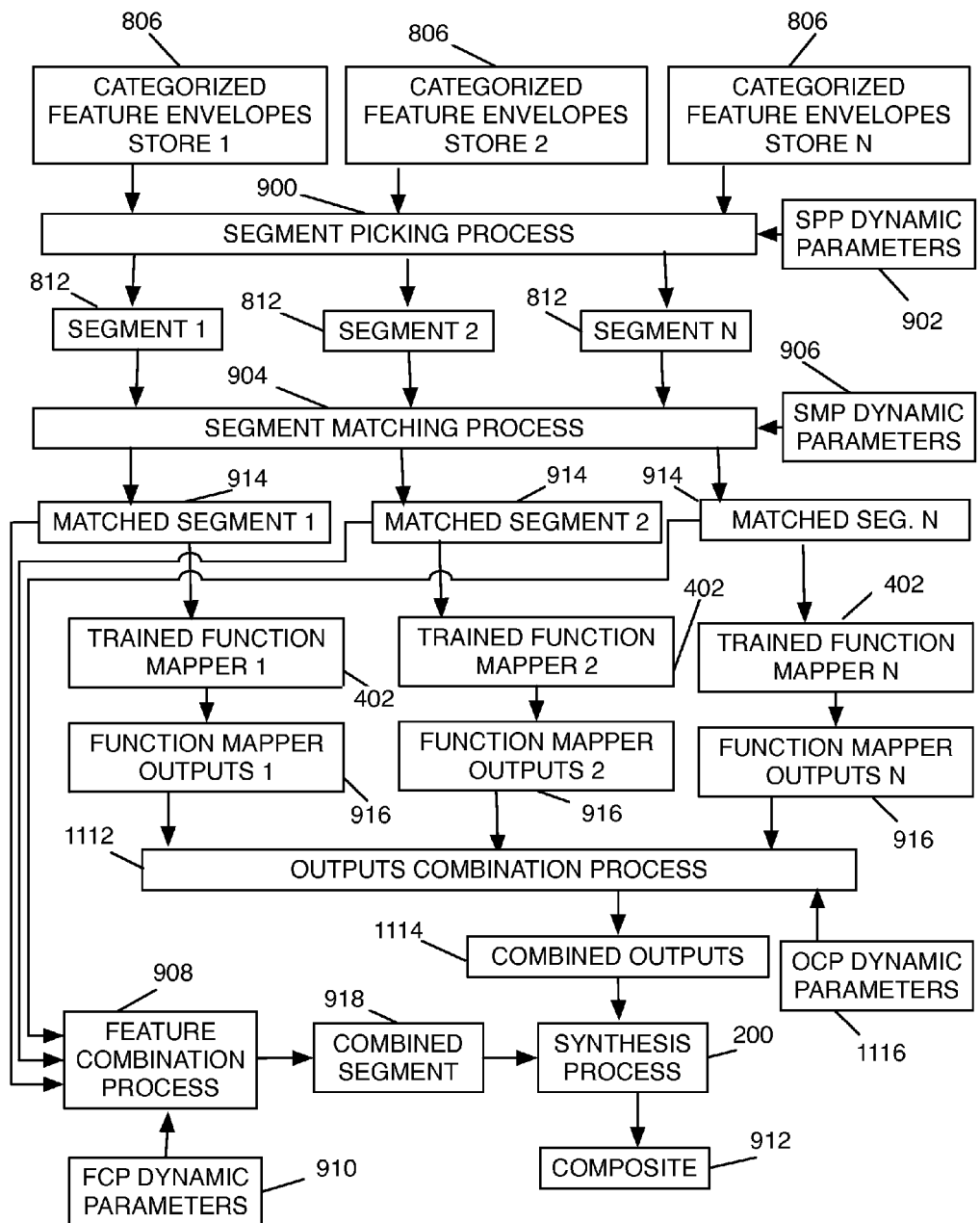
FIG. 11 illustrates a process of combining of two or more segments at the function mapper's outputs level.

FIG. 11 illustrates an example embodiment of a synthesis stage that combines two or more segments at the function mapper's output level with several components labeled as in FIG. 9. An outputs combination process 1112 includes generating new function mapper outputs based on two or more function mapper outputs 916. One example of outputs combination process is linear combination of two or more function mapper outputs 916. Other examples are non-linear combinations of one or more segments; using statistical properties of one or more segments to generate or modify a segment etc. An outputs frame can also be explicitly generated from mathematical formulas (like a warping function for instance) instead of being produced by a trained function mapper then combined to one or more other outputs frames. The outputs combination process 1112 can implement a variety of combining rules such as the combination of two or more segments at the level of the function mapper's outputs 916 as shown in FIG. 11.

As discussed above, an example of synthesis stage combining two or more segments at the function mapper's output level is described in FIG. 11. A corresponding synthesis method includes: performing a segment picking process 900 to pick two or more segments from feature envelope stores 806; performing a segment matching process 904 between all picked segments; feeding matched feature envelope segments 914 to trained function mappers 402 in parallel; performing an output combination process 1112; feeding combined outputs 1114 to the synthesis process 200; performing a feature combination process 908 on the matched feature envelope segments 914 to obtain a combined segment 918.

If the combined outputs 1114 represent only a subset of the parameters needed for synthesis, combined segment 918 exemplar(s) can be fed to the synthesis process 200 to generate the missing parameters. This will be further described below with reference to certain embodiments. Finally the method of FIG. 11 obtains a composite 912 (e.g., a composite data structure) of two or more segments 812.

With reference to FIGS. 9, 10A, 10B, and 11, it should be emphasized that modifications of the different parameters for the different processes involved can be changed from one exemplar to the next. For example, segment picking process (SPP) dynamic parameters 902, segment matching process dynamic (SMP) parameters 906, outputs combination process (OCP) dynamic parameters 1116, discriminant input control 1014, feature combination process (FCP) dynamic parameters 910 can all be changed from one exemplar to the next thus making the resulting composite 912 modifiable as exemplars are fed to the system. If all elements in the chain (e.g., the segment picking and matching process, the function mapper, the synthesis process, the feature and outputs combination processes, etc.) are implemented to operate in real-time, then the changes in the composite 912 can occur in real-time making the composite dynamic or changeable in real-time.

Example Audio Embodiments

Figure 12:
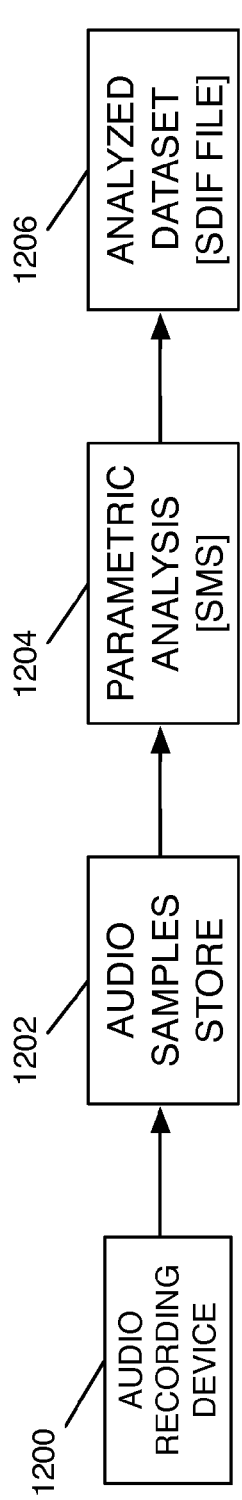
FIG. 12 is a block diagram illustrating a parametric analysis process of recorded audio sample to obtain an analyzed dataset
Figure 13:
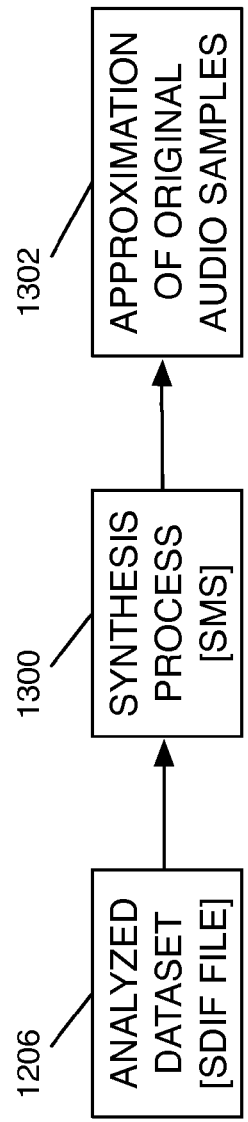
FIG. 13 is a block diagram illustrating a re-synthesis process from the analyzed dataset
Figure 14:
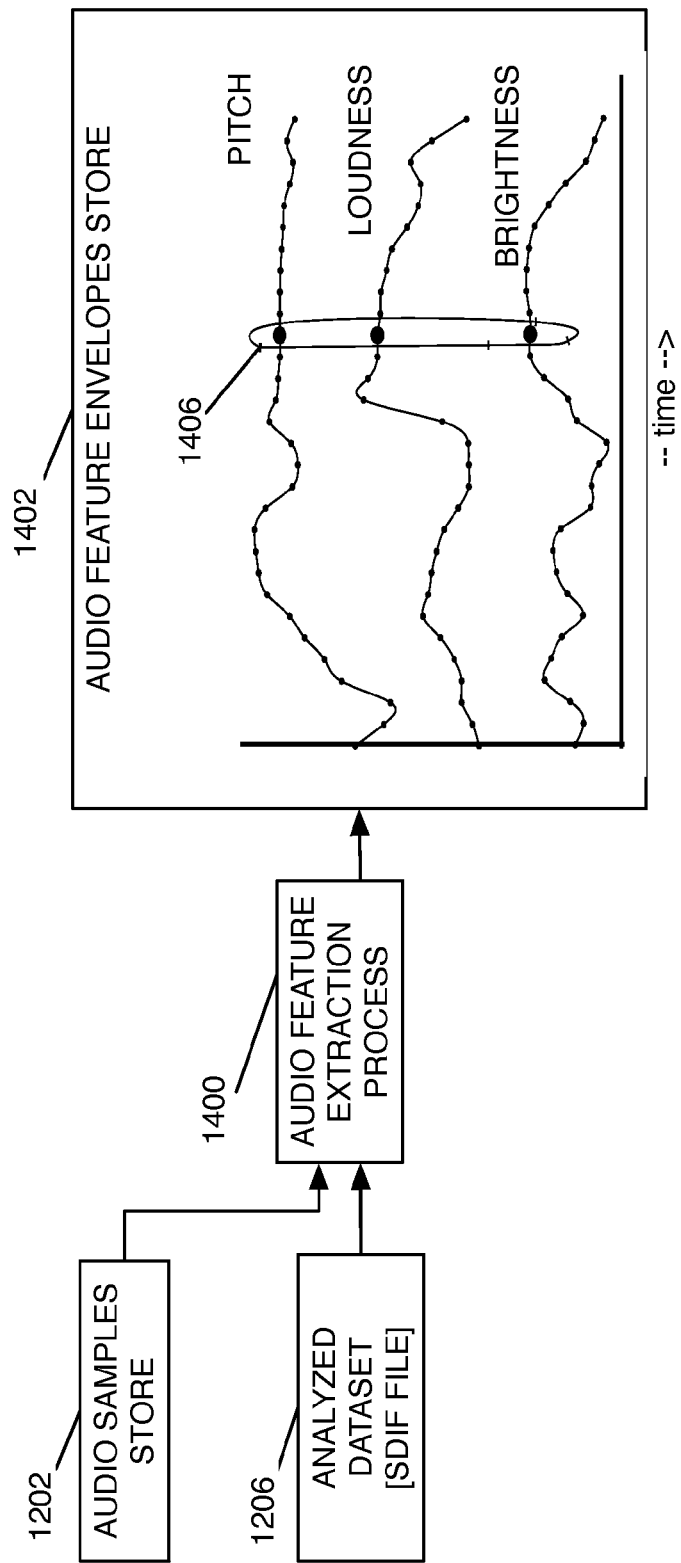
FIG. 14 is a block diagram illustrating a feature extraction process, feature envelopes dataset and feature exemplars.
Figure 15A:
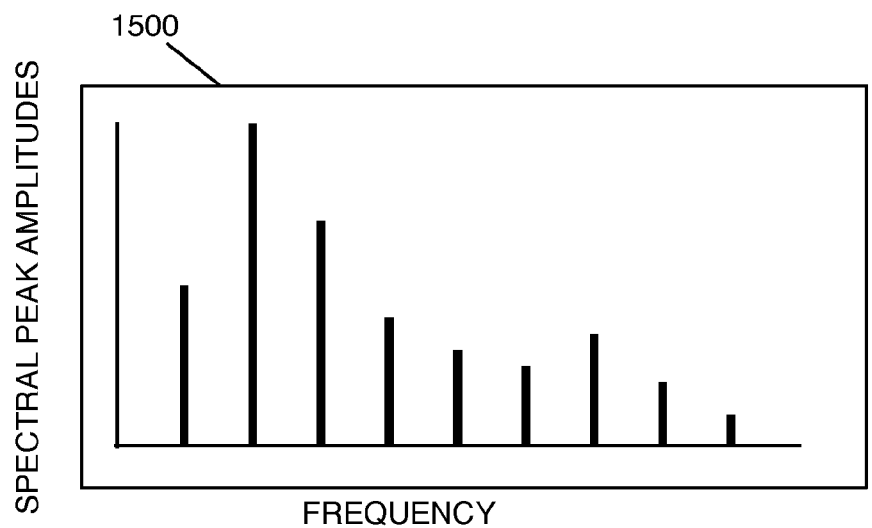
FIG. 15A shows an analyzed dataset exemplar consisting of one frame of spectral peaks.
Figure 15B:
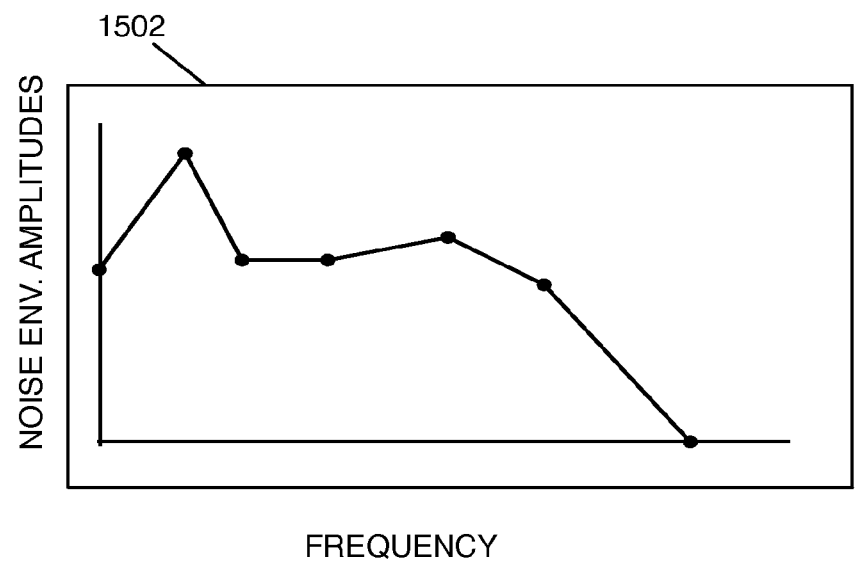
FIG. 15B is an analyzed dataset exemplar consisting of one frame of stochastic envelope.

FIGS. 12, 13 and 14 present embodiments directed to audio applications in correspondence to FIGS. 1, 2 and 3 described above for generally applicable embodiments. FIGS. 15A and 15B show characteristic analysed dataset frames amplitude plots as a function of frequency.

FIG. 12 illustrates a parametric analysis process performed on recorded audio sample from an audio sample store 1202 to obtain an analyzed dataset 1206 (or synthesis parameters set). In accordance with one embodiment, the data to be modeled are monophonic audio recordings such as instruments like flute, saxophone, singing voice or other sounds such as animal sounds, sound effects, and the like. Such samples can be captured using a microphone and an audio recording device 1200, or by any other mean such as recorded from the output of another synthesis process.

The audio samples are then passed to an SMS-type parametric analysis process 1204 based on Spectral Modeling Synthesis (SMS). The result of the SMS-type analysis is stored in a Sound Description Interchange Format (SDIF) file that contains the analyzed dataset. The analyzed dataset is typically organized in timed frames. A deterministic frame typically contains spectral peaks (frequencies, amplitudes, phases) as illustrated by the frame 1500 (FIG. 15A). A typical frame contains generally from ~10 to ~1000 peaks but this number can be chosen to be more or less depending on the audio quality desired and the audio content. A non-deterministic frame typically contains a noise spectrum that can be approximated by a breakpoint function (BPF) (or line segments) 1502 (FIG. 15B). The number of bins depends on the analysis window size which itself depends on the type of sound to be analyzed.

In accordance with one embodiment, operations on the synthesis frames may be further simplified as follows: In the deterministic frames, phase information is discarded. In the non-deterministic frames, linear-segment approximations are performed to obtain a stochastic noise envelope. Fixed critical bands are used for the frequencies. Alternatively, a second peak estimation on this residual spectrum may be applied and non-fixed frequency locations may be used instead.

FIG. 13 illustrates a re-synthesis process performed by using the analyzed dataset 1206 in order to obtain an approximation of the original audio samples 1302. The analyzed dataset 1206 is fed frame by frame to a SMS synthesis process 1300 which performs the inverse operation of the SMS analysis process 1204. One embodiment uses the estimated spectral peaks generated by the SMS process as synthesis parameters. Estimated spectral peaks are approximations of the original spectra; therefore, the re-synthesis process generates only an approximation of the original audio data 1302 and not the original data itself 1202.

FIG. 14 illustrates a feature extraction process 1400 to obtain a feature envelopes dataset 1402. Feature envelopes can be computed from the analyzed dataset 1206 or directly from the captured audio data 1202 or manually assigned using a graphical interface for example.

Feature envelopes are successions of feature envelope frames (or feature envelope exemplars). The values in the feature envelope frames (or feature envelope exemplars, or feature vectors) can be computed from analyzed dataset frames 1500 or 1502 from the audio slices by the feature extraction process 1400. For instance one exemplar can be computed every 10 ms of audio. Features envelopes extracted according to one embodiment include pitch, loudness, and brightness. Algorithms and formulas to compute these feature envelopes are known in the art.

According to one embodiment, pitch is computed for each frame at analysis time by the SMS analyzer using the spectral frames 1500. The pitch feature envelope is present in the SDIF file 1206. Alternatively the pitch can be computed using one of the many pitch estimation algorithm commonly used in the art either in the frequency domain or in the time domain using the original data 1202. Many other features envelopes can be extracted and used. Other examples of standard audio features are described for instance in the MPEG-7 standard specification. Alternative characteristics related to audio signals may be similarly employed.

FIG. 15A shows an analyzed dataset parameter frame 1500 representing spectral peaks amplitudes and frequencies. FIG. 15B shows an analyzed dataset parameter frame representing a stochastic noise envelope (or breakpoint function) approximation 1502 of a residual spectrum frame. Noise envelopes frequencies can be fixed and correspond to critical bands for instance or they can be estimated. These frames 1500, 1502 or their amplitudes are examples of analyzed dataset exemplars.

Figure 16A:
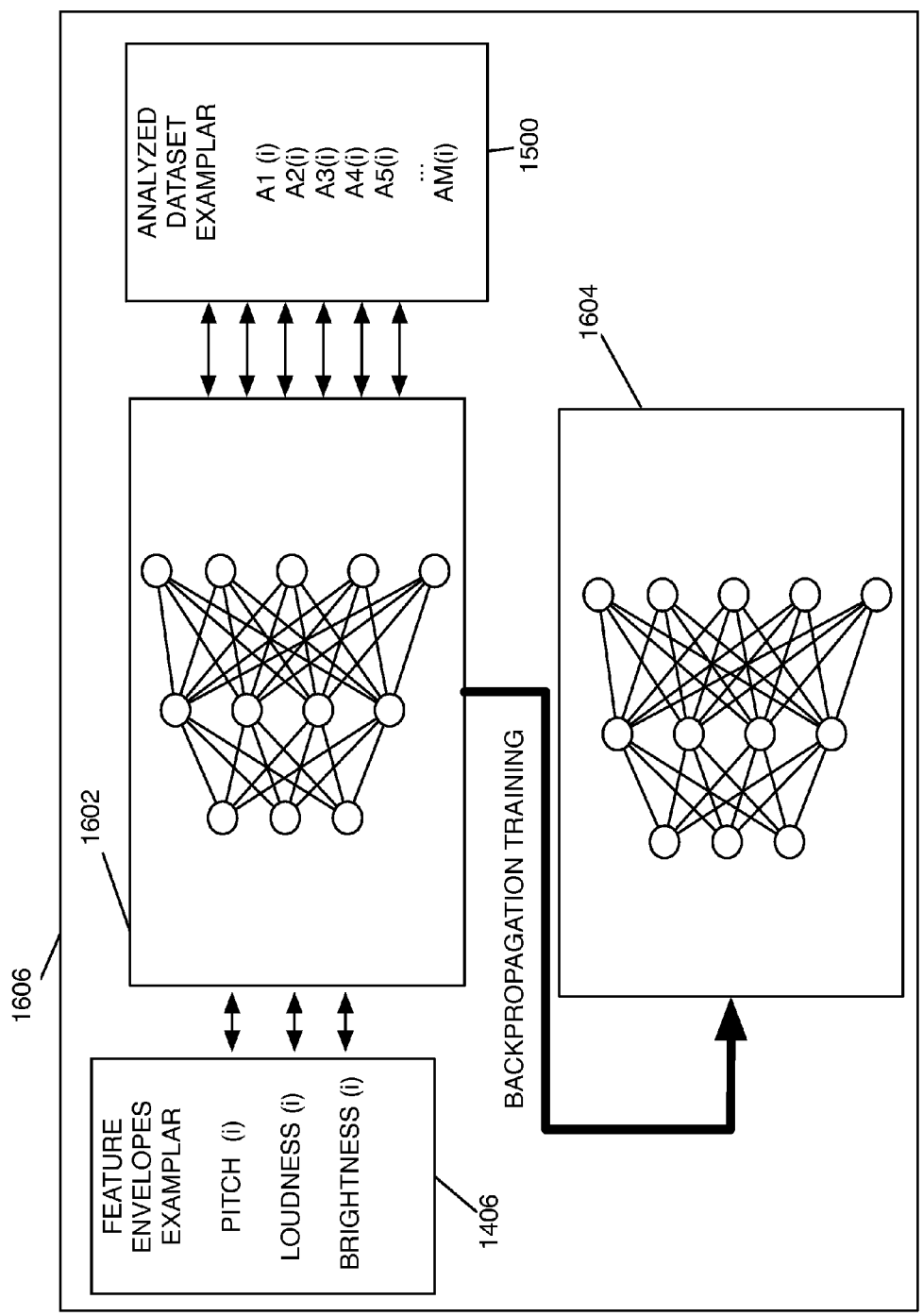
FIG. 16A is an example of the process of building a function mapper between extracted feature envelopes and synthesis parameters, where the function mapper is a multilayer perceptron neural network (MLP).

FIG. 16A shows an example embodiment related building or training a function mapper between extracted feature envelopes 1402 and analyzed dataset 1206 (e.g. as in FIG. 14). In accordance with one embodiment, the function mapper is a Multilayer Perceptron (MLP) neural network 1602 and the training process includes adjusting the MLP's internal parameters (weights and biases) according to a well known backprogpagation algorithm.

As illustrated in FIG. 16A, the MLP is trained to map between feature envelope exemplars 1406 from the feature envelopes dataset 1402 and corresponding analyzed dataset exemplars 1500 from the analyzed dataset 1206. The dataset exemplars 1500 may include the amplitudes (or magnitudes) of the spectral peaks. Exemplars may also include other spectral information such as frequencies for example, and an MLP could be trained on the frequency trajectories to provide the frequencies information needed at synthesis time and thus model sounds that are not purely harmonic. An MLP could also be trained on the noise spectral envelopes to model noise like sounding sounds such as wind or breaths.

According to one embodiment, during the training stage, each feature exemplar 1406 is successively presented at the input of the MLP and each corresponding analyzed dataset exemplar (or analysis frame) 1500 is presented at the output of the MLP as the desired outputs to be learned. According to one embodiment the MLP is trained according to a well known backpropagation algorithm.

Figure 17:
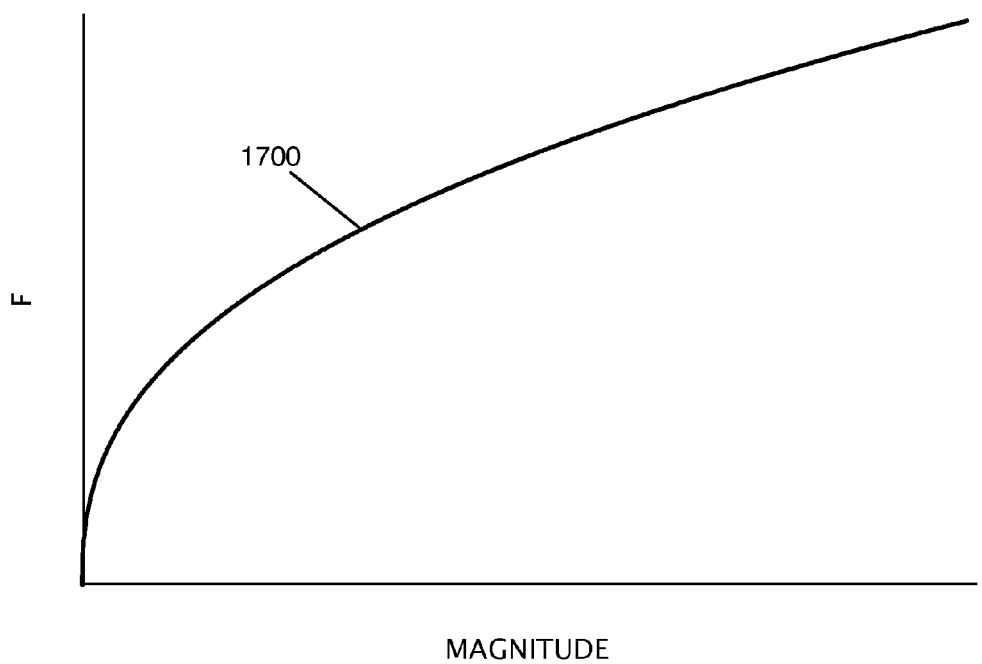
FIG. 17 is an example of a magnitude dependent weighting error function used for function mapper training.

At this training (or design) stage a magnitude weighting (or normalizing) function such as 1700 in FIG. 17 can be applied to the analyzed dataset 1206 or feature envelopes 1402 or both during learning to ensure that all parts of the data are given an equivalent weight (e.g., values of same order of magnitude) at the outputs of the function mapper during training time. The exact form of the function is not critical. When such a function is used at training stage as a normalization function, the inverse function is then applied at synthesis stage to the outputs (or inputs or both) of the function mapper. The magnitude weighting function can also be used as an error function during training instead of the common least mean squared error function.

Using a magnitude dependent weighting function ensures that the lower magnitudes parameters are weighted significantly in order to be properly learned. In some operational settings, using a frequency dependent function may result in an undesired "buzzing sound effect" in parts of the sound where the overall loudness is much lower than the rest of the sound (for instance in ending parts of notes) because not all frequencies in these low loudness parts will be given significant weighting and thus won't be learned properly by the network.

According to one embodiment the architecture of the MLP is characterized as having one input per extracted feature envelope to control and one output per analyzed dataset frame value to control. In one specific embodiment, for example, in the case where the number of partials peaks to be controlled is 100 and the number of feature envelopes is 3, the network has 100 outputs, 3 inputs, one hidden layer of 100 neurons and is fully connected. Other architectures are also suitable. For example, the number of hidden layer or number or hidden neurons can vary, or the MLP can be fully or partially connected. Additionally, shunting units may be added to shunt the outputs to zero if the amplitude is below a certain threshold.

At the end of the training process shown in FIG. 16A, a trained MLP neural network 1604 is obtained with its parameters (e.g., weights, biases) fitted to the training data. Some examples of other function mappers that could be used instead of standard MLP neural networks include Time Delay Neural Networks and Support Vector Machines.

Figure 16B:
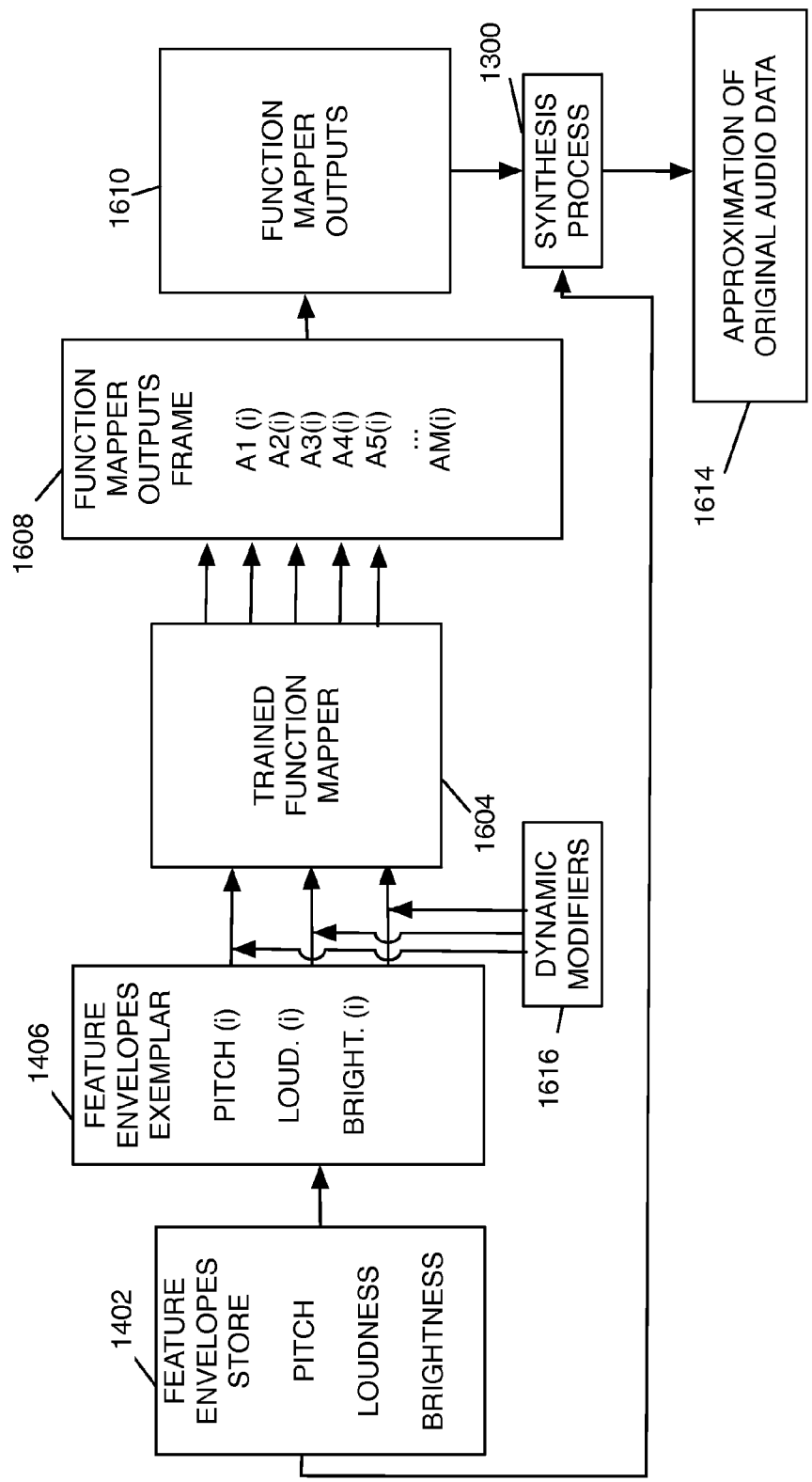
FIG. 16B is an example of the process of feeding feature envelopes to a trained function mapper to obtain an approximation of the original audio data.

FIG. 16B shows an example embodiment of the process of feeding feature envelopes 1402 to a trained function mapper 1604 to obtain an approximation of the original audio data 1614. According to one embodiment original exemplars are presented, one exemplar frame 1406 at a time, to the inputs of the trained function mapper 1604. The trained function mapper outputs one output frame 1608 at a time. For a given original input exemplar 1406, the values of an output frame 1608 are approximations of the original amplitudes $A_i$ in the original exemplar 1500. Each output frame 1608 is presented to the synthesis process 1300 to produce one frame of audio 1614 that is an approximation of the original audio data 1202.

According to one embodiment the function mapper's outputs represent only a subset of the parameters needed for synthesis, namely the spectral peaks amplitudes $A_i$. In that case the frequencies can be reconstructed using the pitch information from the input exemplars 1406 assuming the frequencies are harmonics of the pitch for instance. Therefore, in that case, the pitch information from the currently processed exemplar 1406 from the feature envelopes store 1402 is fed to the synthesis process 1300 in order to reconstruct the harmonic frequencies for each output frame. Alternatively, as discussed above, the MLP or a second MLP could also be trained on the frequency trajectories.

According to one embodiment the synthesis process includes a pre-processing stage (or synthesis parameters reconstructive stage) where the frequencies are computed from the pitch information assuming harmonic frequencies and the phases are computed from frame to frame assuming linear phases and the phases for the first frame are randomly generated.

As all original feature exemplars 1406 are presented to the trained function mapper 1604, an approximation of the original audio is produced. The synthesis process 1300 is controlled to run at the same time rate than the analysis as in a standard SMS analysis/synthesis method.

FIG. 17 shows an example of a perceptually appropriate weighting function used for training. It depends on magnitude to ensure that low magnitudes are given an appropriate weighting regardless of the frequency. Also this weighting function is general as it can be applied to a wide variety of fields and not only to audio.

Figure 18A:
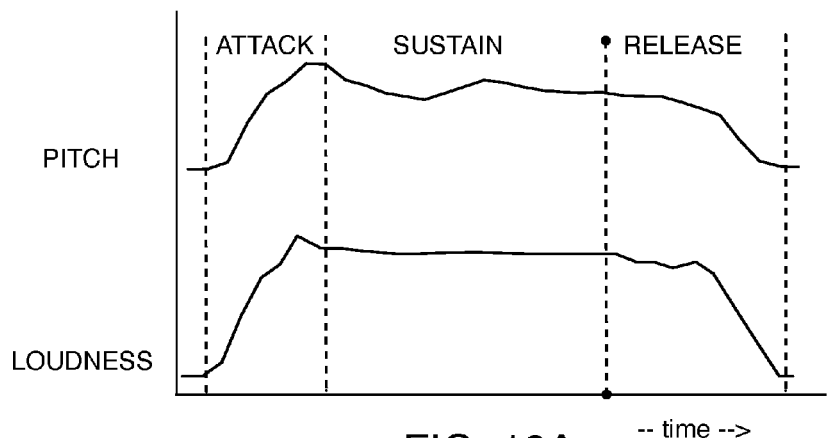
FIG. 18A is an example of a categorized feature envelopes set resulting from a segmentation and categorization process.

FIG. 18A is an example of a categorized audio feature envelopes set resulting from a segmentation and categorization process, where the categories include "Attack," "Sustain," and "Release." The segmentation and categorization process (or annotation process) consists in manually or automatically finding or assigning boundaries to the feature envelopes and or the original dataset so as to identify segments (or regions) and in categorizing segments (or regions) of the envelope feature set and/or of the original dataset. Such segmentation and categorization can be achieved manually using a graphical editor or automatically using some techniques known in the field.

Figure 18B:
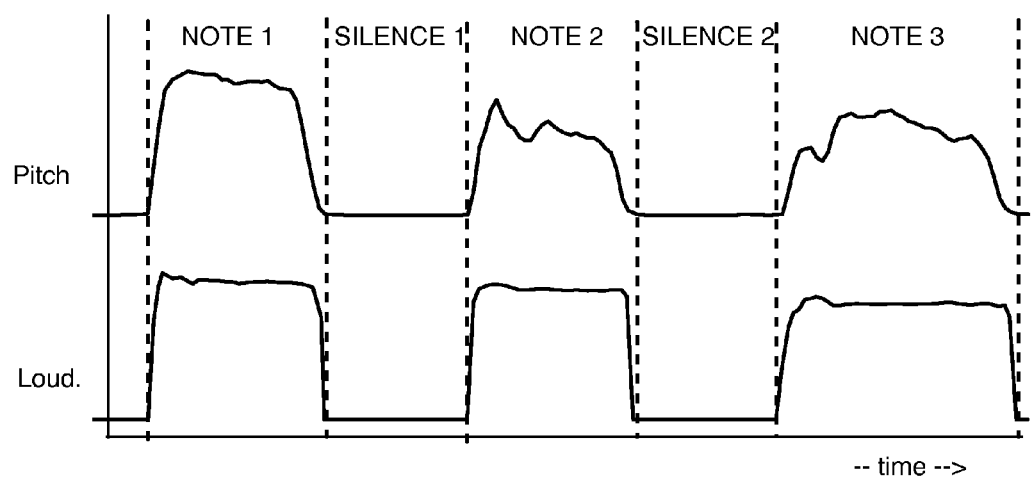
FIG. 18B is an example of a categorized feature envelopes set resulting from a segmentation and categorization process at a higher scale than FIG. 18A.

FIG. 18B is an example of a categorized feature envelopes set resulting from a segmentation and categorization process at a higher scale than FIG. 18A. In FIG. 18B the categories include "Note" and "Silence" (e.g., "Note 1," "Silence 1", "Note 2," Silence 2," and "Note 3.")

Figure 18C:
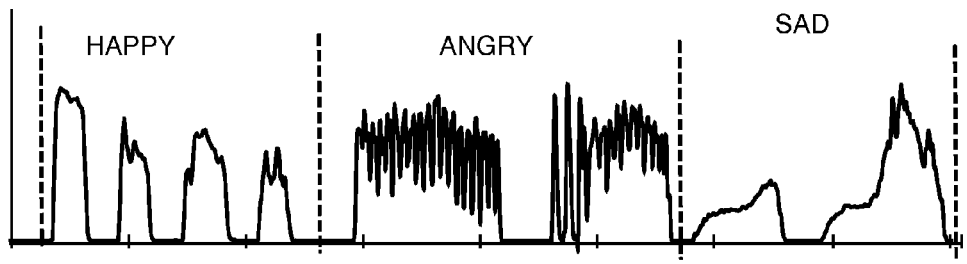
FIG. 18C is an example of a categorized feature envelopes set resulting from a segmentation and categorization process at a higher scale than FIG. 18B.

FIG. 18C is an example of categorized feature envelopes set resulting from a segmentation and categorization process at a higher scale than FIG. 18B. In FIG. 18C the categories include "Happy," Angry," and "Sad."

Figure 18D:
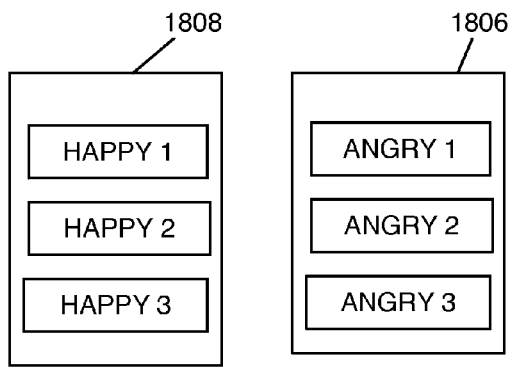
FIG. 18D is an example of collections of categorized feature sets with the same characteristics.

FIG. 18D is an example of showing that collections of categorized feature sets with the same characteristic, that can be used for generating full audio characters. In FIG. 18D a first set 1806 of characteristics relates to "Angry," and the second set 1808 of characteristics relates to "Happy."

Figure 18E:
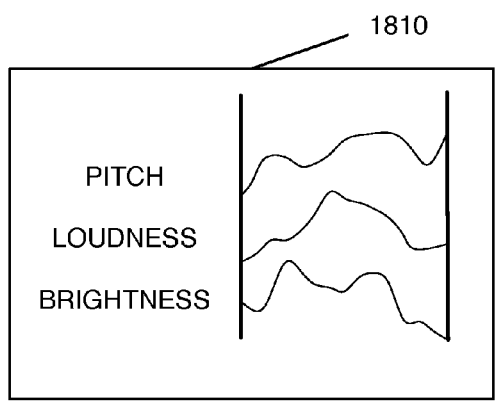
FIG. 18E is an example of a feature envelope segment

FIG. 18E is an example of a feature envelope segment 1810 including features envelopes for "Pitch," "Loudness," and "Brightness."

Figure 19:
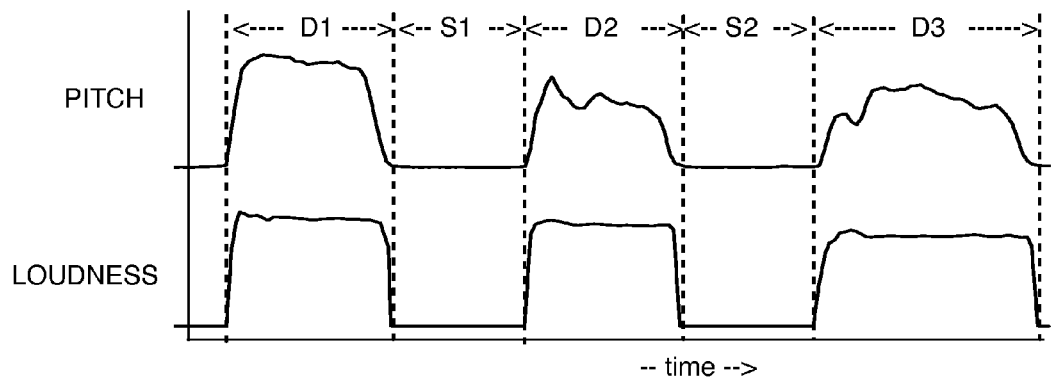
FIG. 19 shows an example of timing information

FIG. 19 is an example of timing information that can be extracted from the extracted feature set or from the original audio dataset. D1 is the duration of segment #1, S1 is the duration of silence #1, D2 is the duration of segment #2, and so forth. Thus, statistical information about durations can be extracted at analysis time and used at synthesis time. For example, one can extract statistical distributions of durations from a collection (or pool) of categorized feature sets 1808 to generate envelopes that have the same statistical distribution of durations than the collection 1808.

Figure 20:
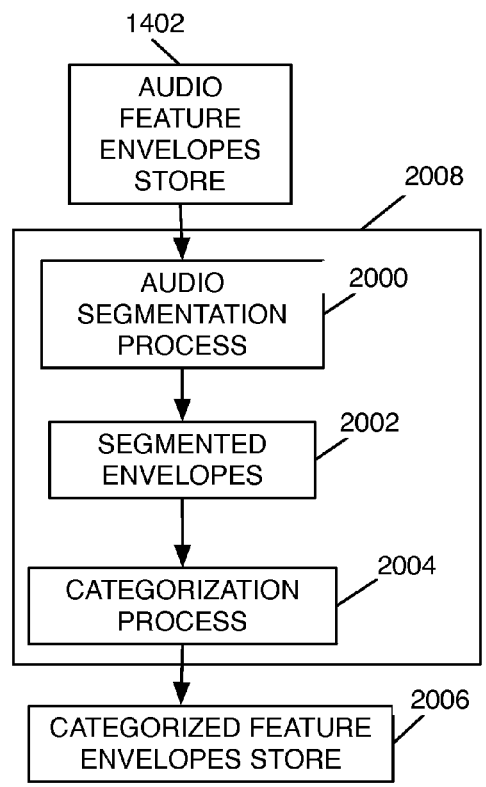
FIG. 20 is a block diagram illustrating a process of segmenting and categorizing feature envelopes.

FIG. 20 is a block diagram illustrating a process 2008 of segmenting and categorizing feature envelopes according to an example embodiment. The segmentation process 2000 includes manually or automatically finding or assigning boundaries to the feature envelopes or to the original dataset so as to identify audio segments (or regions). Segmentation can be performed at different scales. In the case where the original audio is a musical phrase of one instrument for instance, segmentation can be performed at the note level where one note would correspond to one segment, or a sub-note level where attack, sustain and release for instance would be segments, or at the phrase level where groups of notes would be one segment. Automatic segmentation algorithms are common in the field. Segmentation at many different levels can be performed on the same dataset.

The categorization process 2004 includes automatically or manually assigning categories or labels to different audio regions or audio segments. Categories can be integers or names corresponding to specific characteristic of the segment. The results of the segmentation/categorization process 2008 include timing information such as beginning/ending time of the segment, and one or more labels to assign one or more categories to the segment. This information can be stored together with the corresponding feature envelope in a categorized feature envelopes store 2006.

Figure 21A:
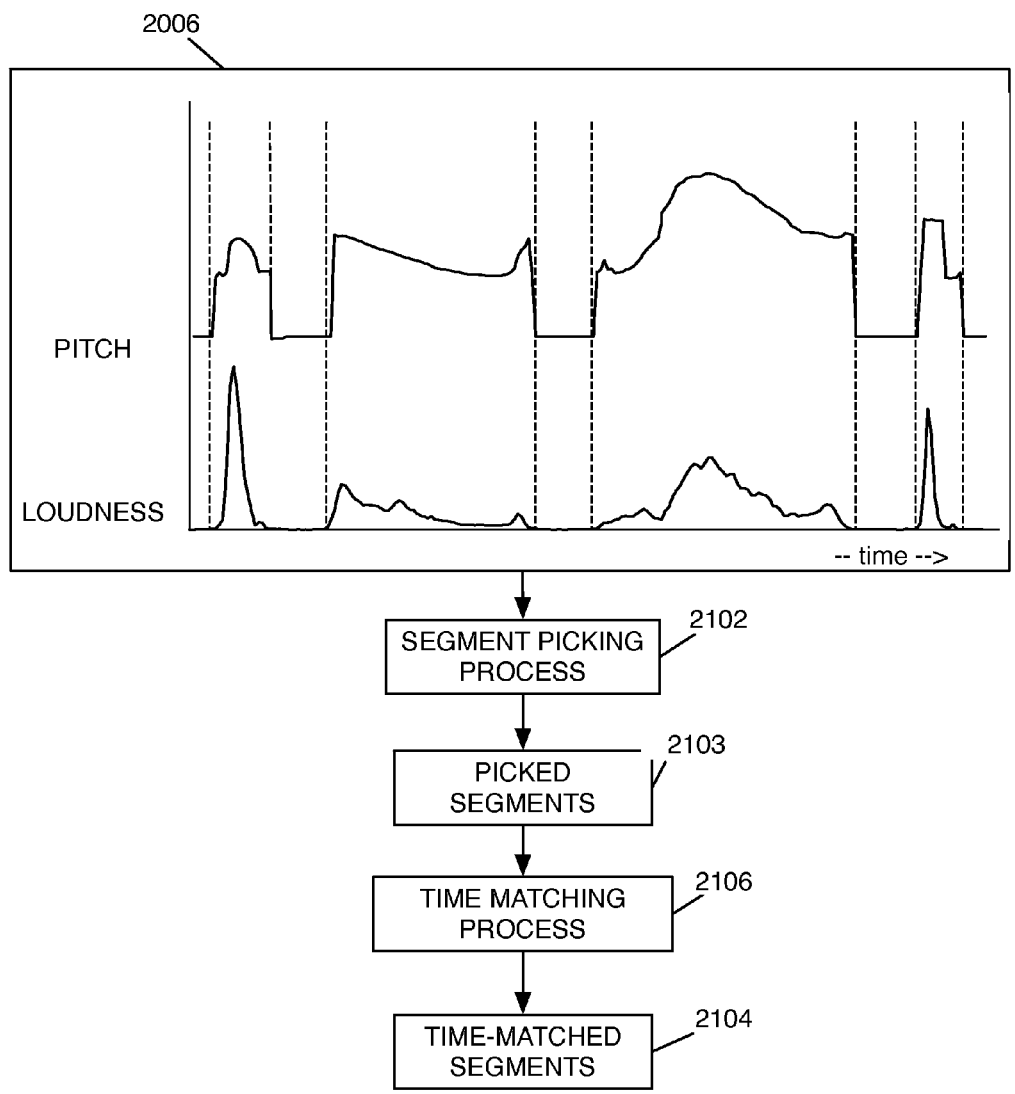
FIG. 21A illustrates a segment picking process and a segment time matching process.

FIG. 21A illustrates a segment picking process 2102 and a segment time matching process 2106. The segment picking process 2102 includes picking one or more segment from a dataset including one or more categorized feature envelopes 2006. This process 2102 can be random, manual or can follow certain rules which can be designed at design time, such as: "pick the first segment of one data set and the first segment of a second dataset, then pick the second segment of the first dataset and the second segment of the second dataset etc." As another example a rule could be "pick segments that fit a predetermined statistic distribution."

Figure 21B:
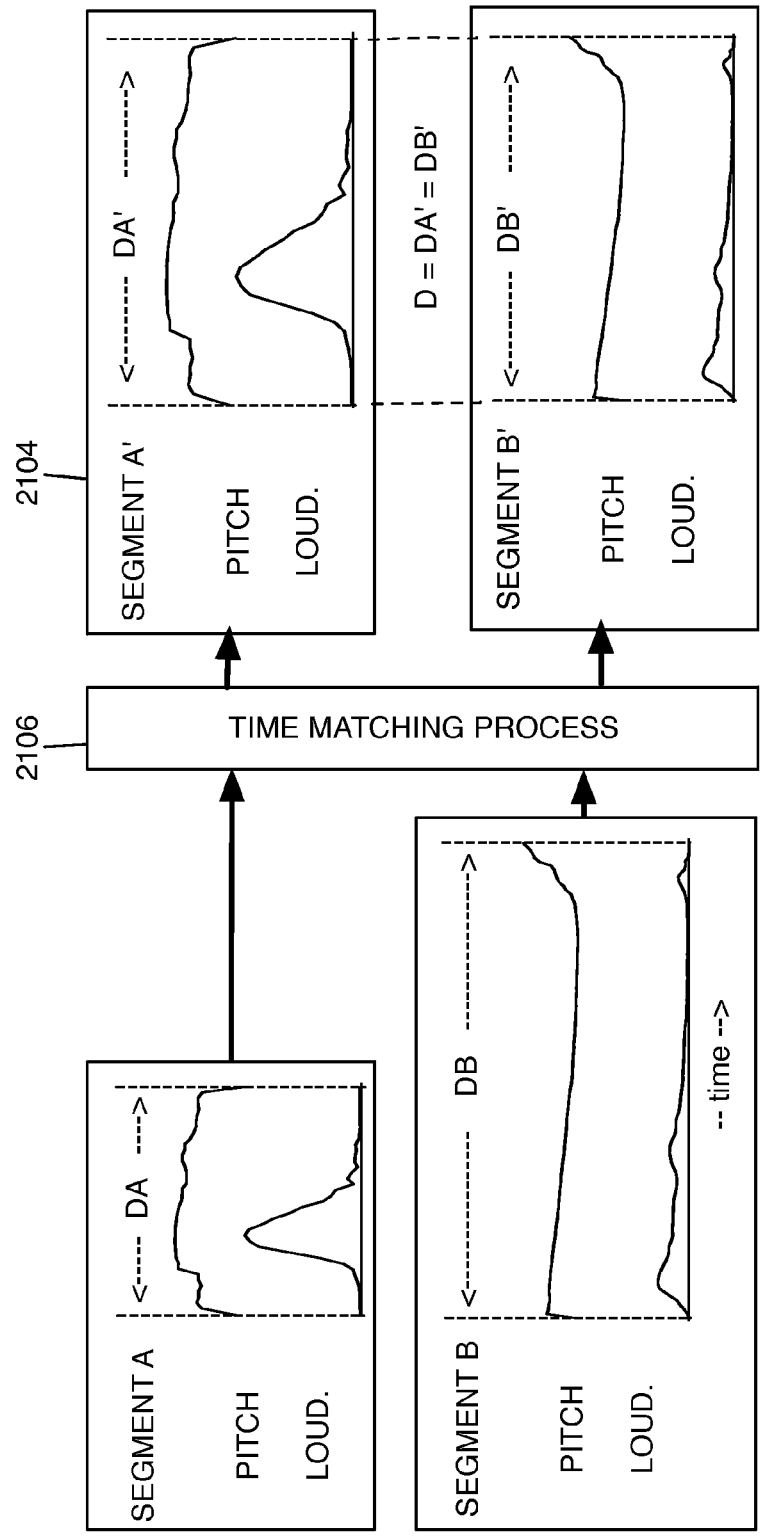
FIG. 21B further illustrates a segment time matching process

The time-matching process 2106 is described further with reference to FIG. 21B. FIG. 21B illustrates a feature envelope segment time matching process 2106 between two segments A and B according to an example embodiment. Segment A has duration DA and segment B has duration DB. A new desired duration D is picked. For example, D can be DA or DB or a linear or non-linear combination of DA and DB or an arbitrary value. The values of feature envelopes of segment A are interpolated to become a new segment A' of duration DA'=D. The values of feature envelopes of segments B are interpolated to become a new segment B' of duration DB'=D.

Figure 21C:
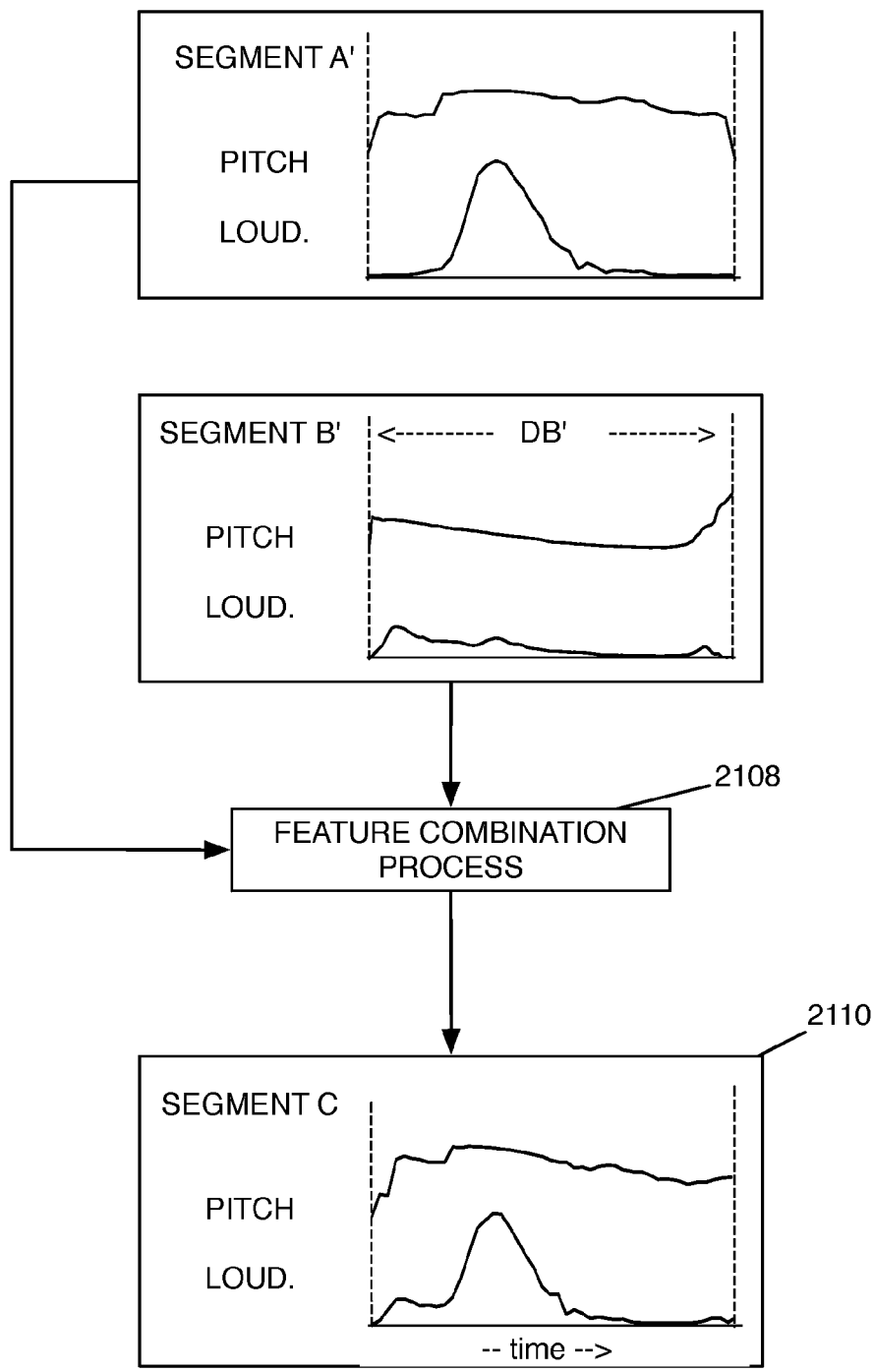
FIG. 21C is an example of a two-segment linear combination process.

FIG. 21C is an example of combination process of two time-matched feature envelope segments A' and B' according to an example embodiment. In this example the combination process consists in a linearly combining each corresponding feature envelopes from the different segments. Pitch of segment A' is linearly added to pitch of segment B' and loudness of segment A' is linearly added to loudness of segment B'. The combination process can also be for instance non linear and across different feature (Pitch of A' combined with loudness of B' for instance). Also although only two segments are added in the figure, feature combination process can be applied to more than two segments. In this example, the coefficients (or parameters) of the linear combination can be normalized or constrained to have their sum equals to 1 for instance to ensure that the combined segment's energy is not out of bounds.

One advantage of feature combination processes is that, to some degree, the natural correlations are preserved because a succession of several naturally correlated exemplars is used to modify a succession of several other naturally correlated exemplars. Succession can relate to time, space (e.g., adjacent) or any dimension relevant to the application and object or process modeled. According to one embodiment, many naturally correlated exemplars are modified at a time using many other exemplars which themselves are naturally correlated. Therefore, the modified segment inherits natural correlations from each original segment and thus is more likely to be perceptually natural.

Three more detailed audio embodiments are discussed below. Each embodiment includes two stages: a training stage and a synthesis stage. The combination of two or more segments occurs at the function mapper's input level for the first embodiment, at the function mapper's body level for the second embodiment, and at the function mapper's output level for the third embodiment.

Example Audio Embodiment #1

Figure 22A:
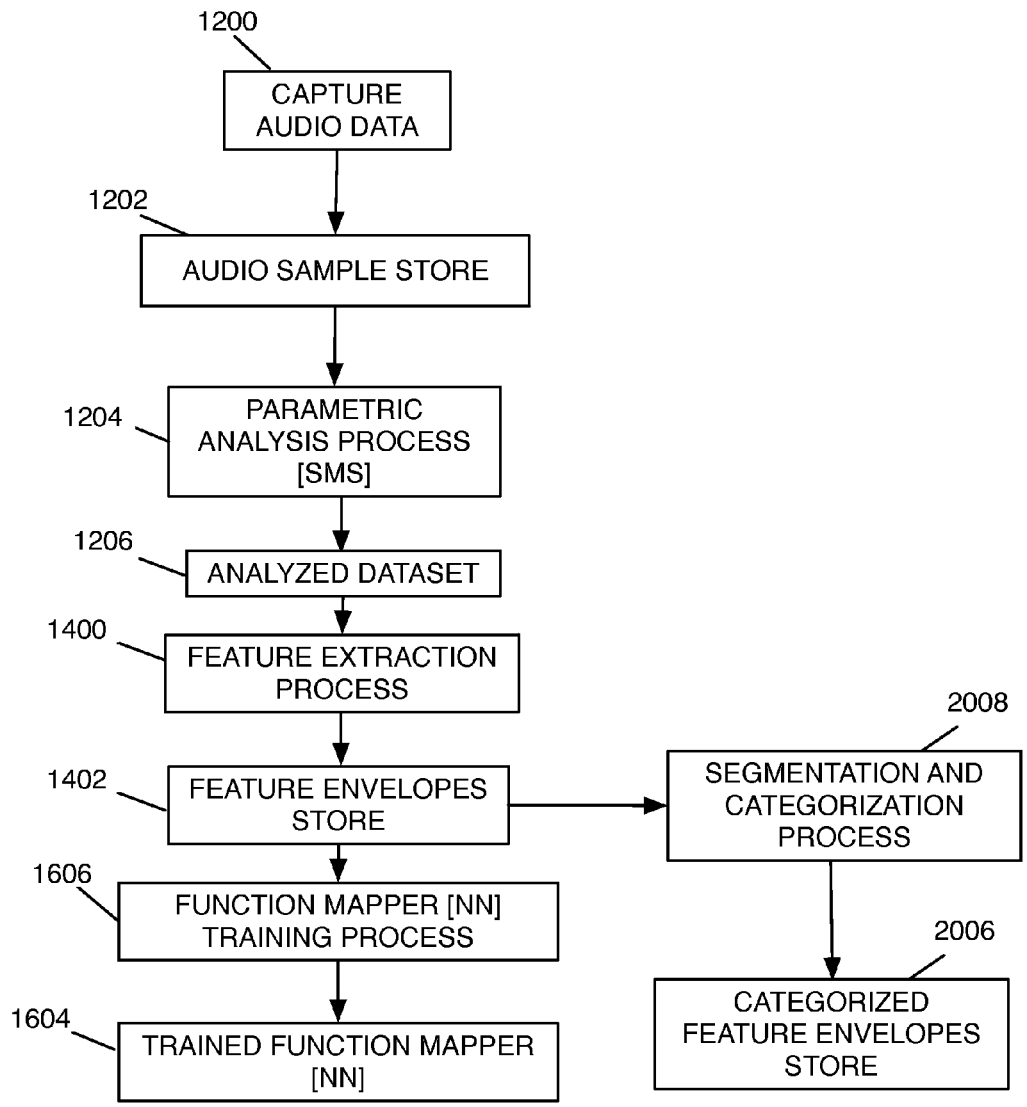
FIG. 22A illustrates the training stage of embodiment #1: combination of two or more segments at the FM input level.

FIG. 22A illustrates the training stage of audio embodiment #1 including a combination of two or more segments at the function mapper's input level. First, two or more sounds (e.g., two babies crying) are recorded as captured audio data 1200 and joined in a single audio sample store 1202 (e.g., as a Waveform Audio File Format (WAV) file). Next perform parametric SMS analysis 1204 of the WAV file to obtain an analyzed dataset 1206 of all the sounds. Next perform feature extraction 1400 on all sounds to extract pitch and loudness envelopes for instance. Next perform segmentation and categorization process 2008 on all envelope feature sets to obtain categorized (or labeled, or annotated) feature envelopes store 2006. Categorization here can consist in assigning one value for silence regions, and a different value for non-silent regions. Automatic silence detection algorithms are common in the field and can be used here.

Next train a Neural Network MLP 1602 on all datasets, to map extracted feature exemplars 1406 to corresponding analyzed dataset exemplars 1500 according to training process 1606 where the outputs exemplars are spectral peaks amplitudes of spectral peaks 1500 (FIG. 15A). Other embodiments can include peaks frequencies or breakpoint values of noise spectral envelopes 1502 (FIG. 15B). The training process typically uses a magnitude dependent weighting or normalizing function 1700 to give equivalent weights (e.g., weights of same order of magnitude) to each value of the analyzed dataset exemplars.

A trained MLP neural network (function mapper) 1604 is then obtained together with a categorized feature envelopes 2006 store.

Figure 22B:
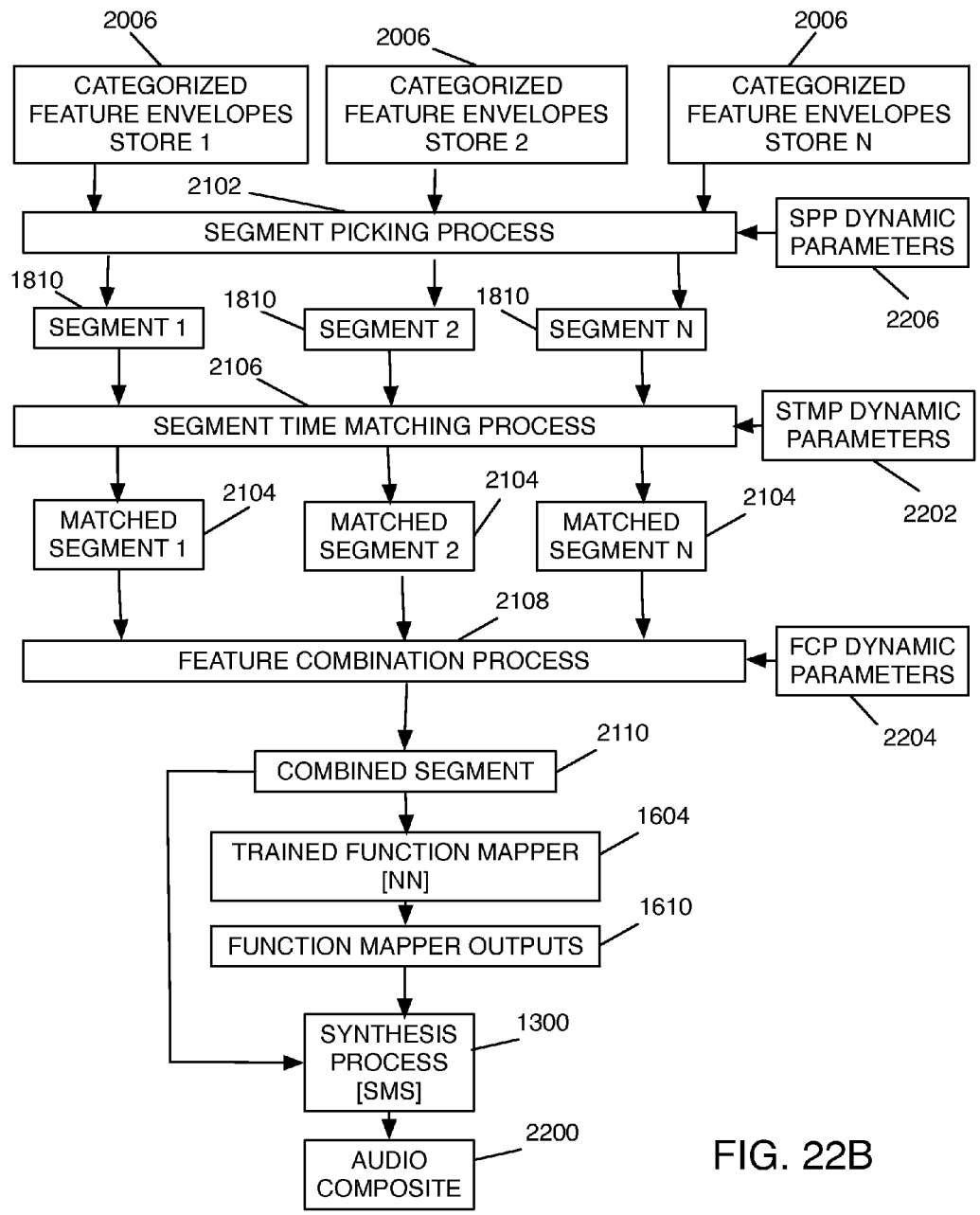
FIG. 22B illustrates the synthesis stage of embodiment #1: combination of two or more segments at the FM input level.

FIG. 22B illustrates the synthesis stage of audio embodiment #1, similarly as in FIG. 9, for a combination of two or more segments at the function mapper's input level. First, perform segment picking 2102 to pick two or more segments from feature envelopes stores 2006. Next, perform segment time-matching process 2106 to obtain time-matched segments. Next, apply a feature combination process 2108 to the time-matched segments to obtain a combined segment 2110. Next feed the combined segment 2110 to the trained function mapper 1604. Next feed the function mapper's outputs 1610 to synthesis process SMS 1300.

According to one embodiment the synthesis process 1300 includes a pre-processing stage where the frequencies are computed from the pitch information assuming harmonic frequencies and where the phases are computed from frame to frame assuming linear phases as common in the field. Phases for the first frame can be randomly generated. Next, feed the combined segment 2110 pitch information to synthesis process 1300 to compute frequencies. Finally, obtain a perceptually natural audio composite of two or more segments 2200. For instance, in the case where the original segments are two or more different segments from different baby-crying sounds segments, the composite could sound like a new baby-crying sound that inherits some perceptual properties from the two or more original segments. Note that in audio embodiment #3 segments are also combined at input levels (e.g., as in audio embodiment #1).

Example Audio Embodiment #2

Figure 23A:
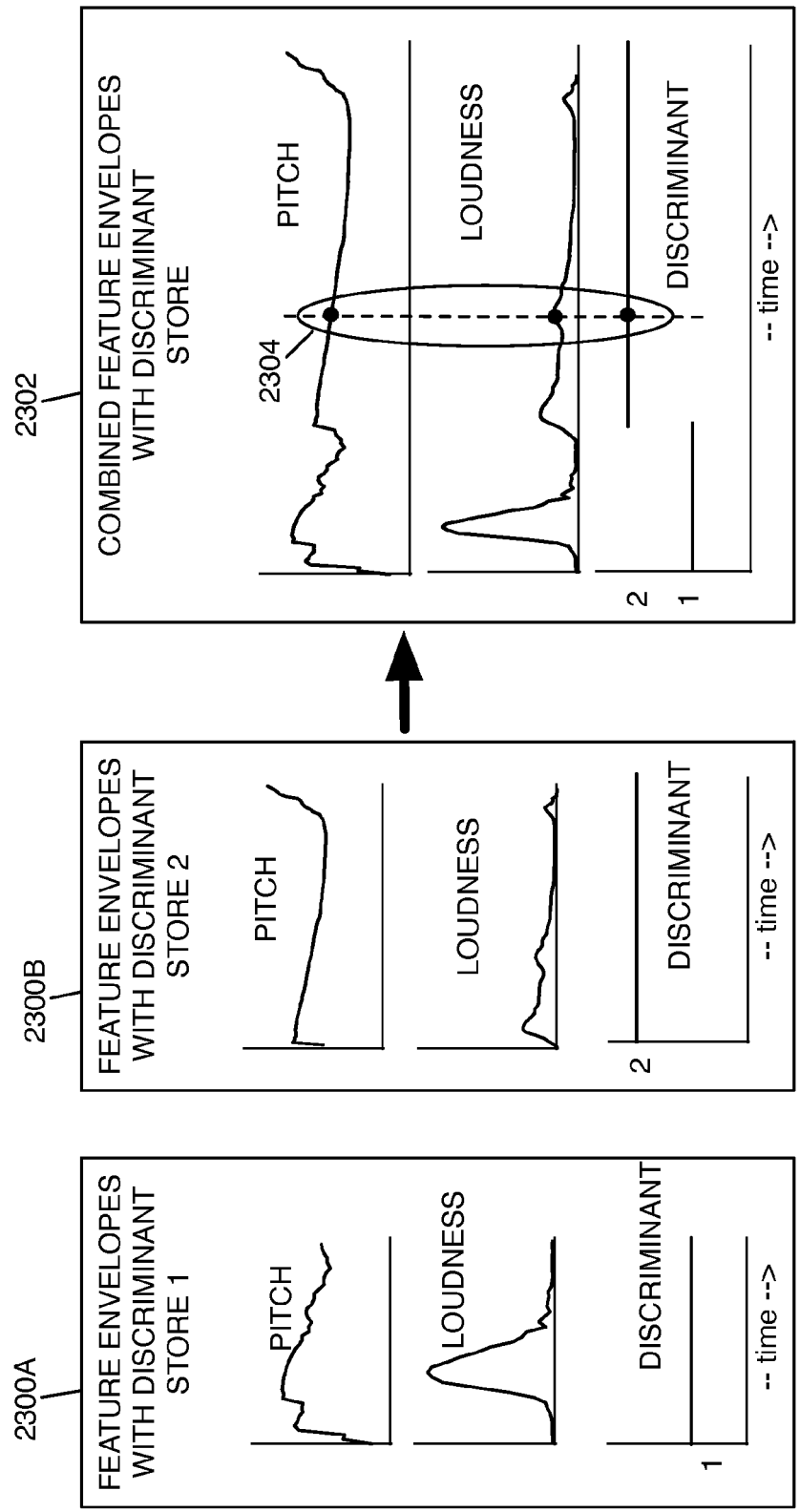
FIG. 23A illustrates a combination of envelope features in the same training set.

FIG. 23A illustrates the training stage of audio embodiment #2 including a combination of two or more segments at the function mapper's body level. In FIG. 23A feature envelopes from two different audio segments 2300A, 2300B are combined (or joined) using a discriminant input to provide combined feature envelopes with one or more discriminants 2302. Discriminants can be manually assigned using a graphical editor for instance. Alternatively, some features can be used as natural discriminant. For example, formants 1 and 2 can serve to perceptually discriminate between two vowels. Therefore formant envelopes extracted automatically according to techniques known in the field can also be used as discriminants. In the example illustrated in FIG. 23A, the discriminant value is used as an "inverse classifier" value to generate data patterns.

Figure 23B:
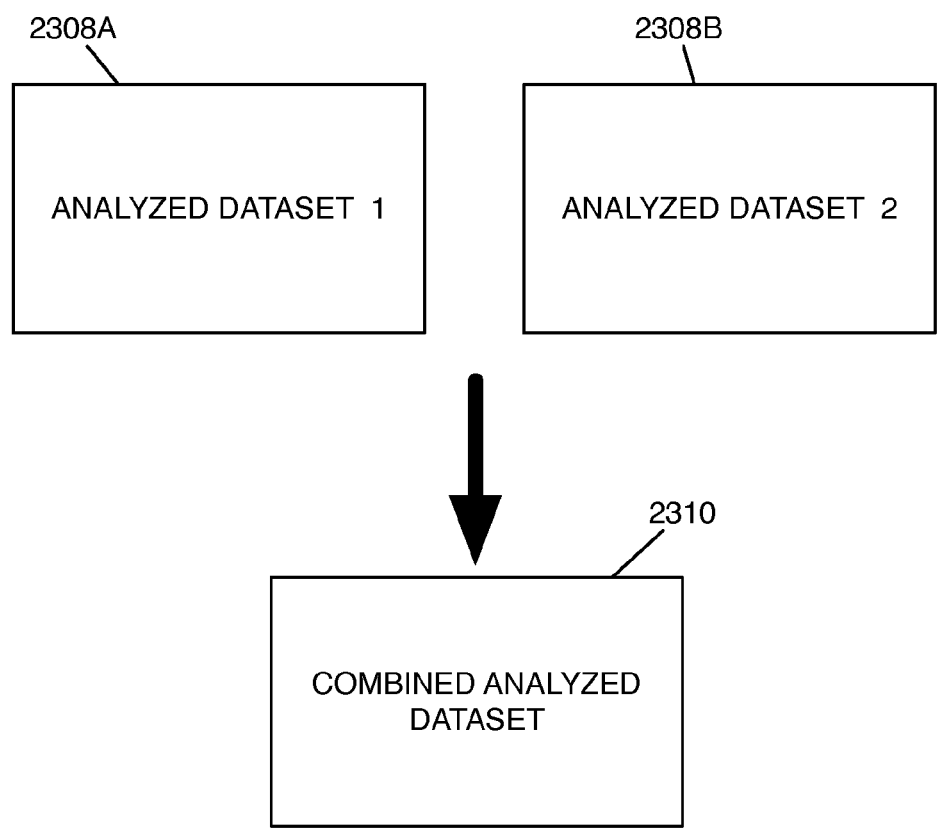
FIG. 23B illustrates a combination of analyzed datasets in the same training set.

FIG. 23B illustrates a combination of analyzed datasets in the same training set. According to one embodiment, the analyzed dataset exemplars 2308A, 2308B are combined successively in time so that each analyzed dataset exemplar matches the corresponding feature envelopes exemplar in time in a combined analyzed data set 2310.

FIG. 24 is an illustration of a function mapper 2400 with inputs 2408 including one discriminant input 2406. During the backpropagation training with discriminant input process 2404, the two segments are presented to the neural network 2400 for learning. During training, the discriminant input informs the function mapper of what type (or category) of segment it is currently learning. This process is an example of combination of two or more segments at the function mapper's body level. The neural network actually learns properties from both segments and the resulting trained MLP with discriminant input 2402 is able to discriminate and interpolate between them.

Figure 25A:
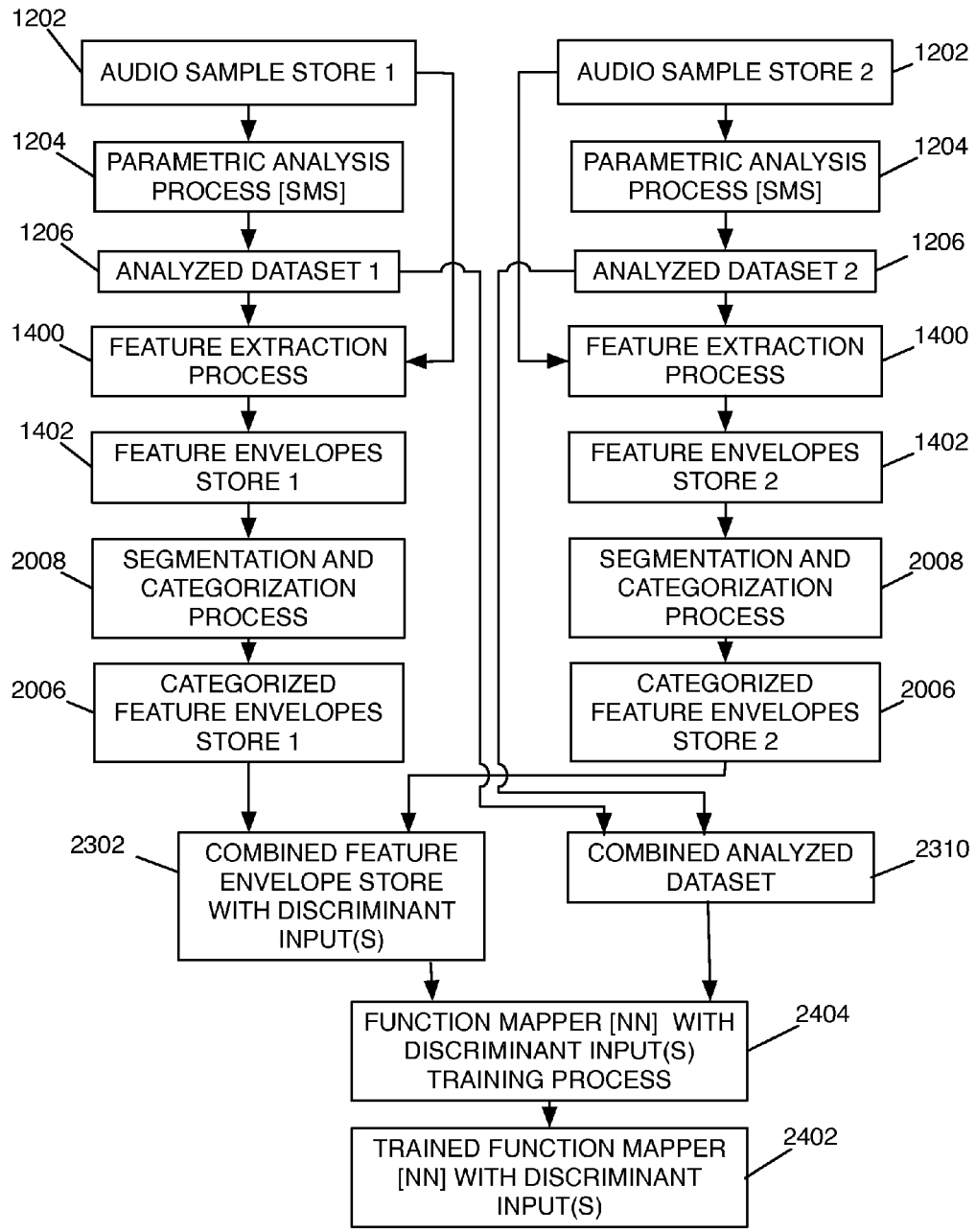
FIG. 25A illustrates the training stage of embodiment #2: combination of two or more segments at the FM's body level using discriminant inputs.

FIG. 25A illustrates the training stage of audio embodiment #2: for a combination of two or more segments at the function mapper's body level. First, record two or more sounds (e.g., audio sample stores 1202). For example, these sounds may include a melody of a voice singing the vowel "O" and a melody of a voice singing the vowel "A". Then perform parametric analysis 1204 to obtain two or more analyzed datasets 1206. Then perform feature extraction 1400 on all sounds to extract pitch and loudness envelopes for example. Then perform segmentation and categorization process 2008 on all envelope feature sets to obtain two or more feature envelopes with discriminant inputs 2006. Categorization here can be done by manually assigning two or more constant values. For instance the value "1" for the "A" melody for store 1 and the value "2" for the "O" melody. Then add a discriminant envelope corresponding to these discriminant values to obtain two feature envelope stores as in 2300A and 2300B.

Then train a function mapper with a discriminant input such as an MLP neural network 2400 according to backpropagation training process 2404 where the outputs exemplars are spectral peaks amplitudes. The categories "1" and "2" can be used as discriminant input envelopes for performing a training process 2404 on the function mapper to map between combined feature envelope store 2302 and combined analyzed dataset 2310 as to obtain a trained function mapper 2402 with discriminant input.

Figure 25B:
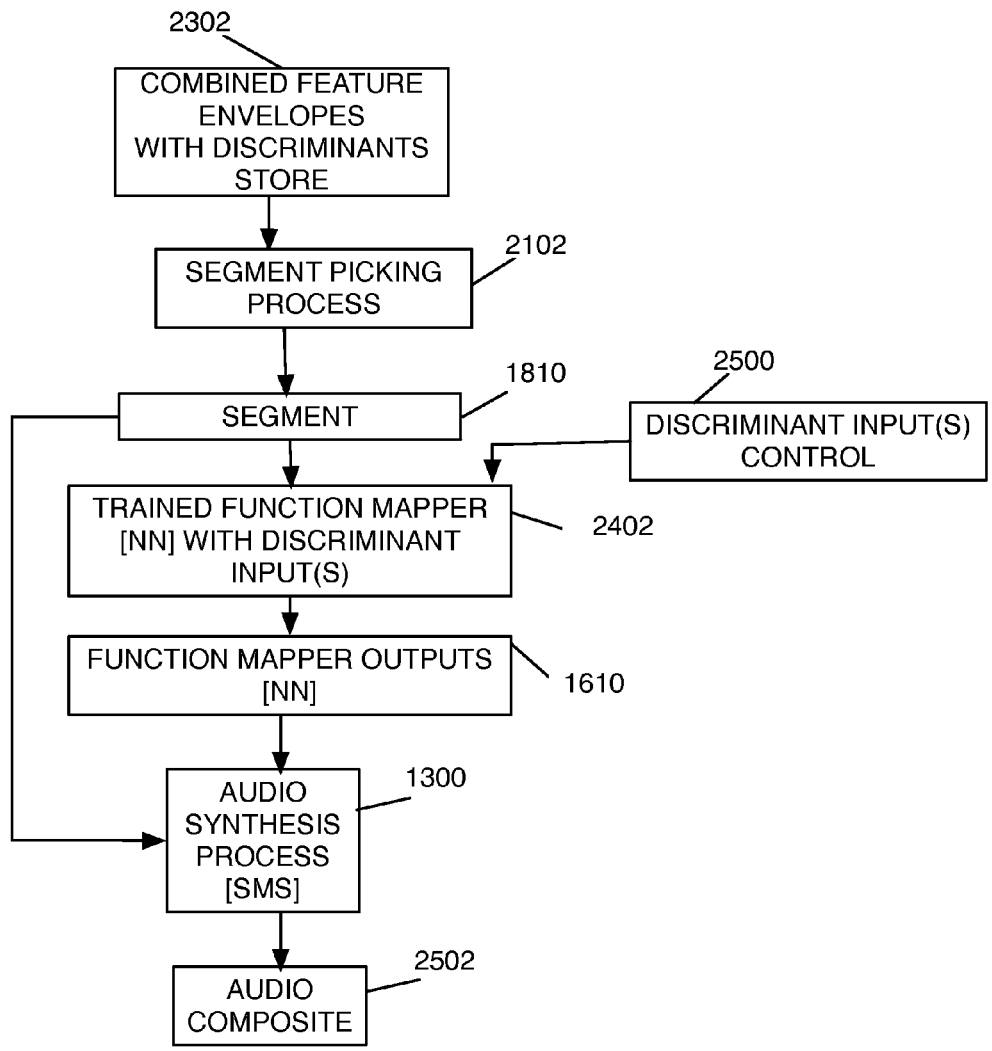
FIG. 25B illustrates the synthesis stage of embodiment #2: combination of two or more segments at the FM's body level using discriminant inputs.

FIG. 25B illustrates the synthesis stage of embodiment #2 including a combination of two or more segments at the function mapper's body level. With reference to the training stage discussed above with reference to FIG. 23A, the trained function mapper 2402 with inputs including one or more discriminants is assumed to have learned both sounds segments (i.e., the melody in "A" and the melody in "O"). The trained function mapper 2402 is now able to interpolate between "O" and "A." Next pick 2102 one of the segments in the combined feature envelope store 2302. For instance pick the segment 1810 where the voice is singing the melody with the vowel "A."

Next in FIG. 25B feed the extracted feature envelope from the segment singing the vowel "A" to the trained function mapper 2402 with one or more discriminant inputs. Then smoothly changing the discriminant input value from 1 to 2 will then alter the function mapper outputs 1610 to smoothly change parameters corresponding to singing "O" instead of "A" while preserving the other characteristics of the sound.

Changing the discriminant input's value continuously between 1 and 2 and back to 1 will alter the melody in "A" to be sung in "O" and back to "A" progressively as the melody is playing. Using the same method one can create composites from the voice of one singer to another singer by using a discriminant that categorizes voice 1 and voice 2 where singer 1 and 2 are not the same for instance.

Next in FIG. 25B feed the function mapper's outputs 1610 to synthesis process SMS 1300. Next feed segment 1810 pitch information to synthesis process 1300 to compute frequencies. Finally in FIG. 25B obtain the audio composite 2502.

Example Audio Embodiment #3

Figure 26:
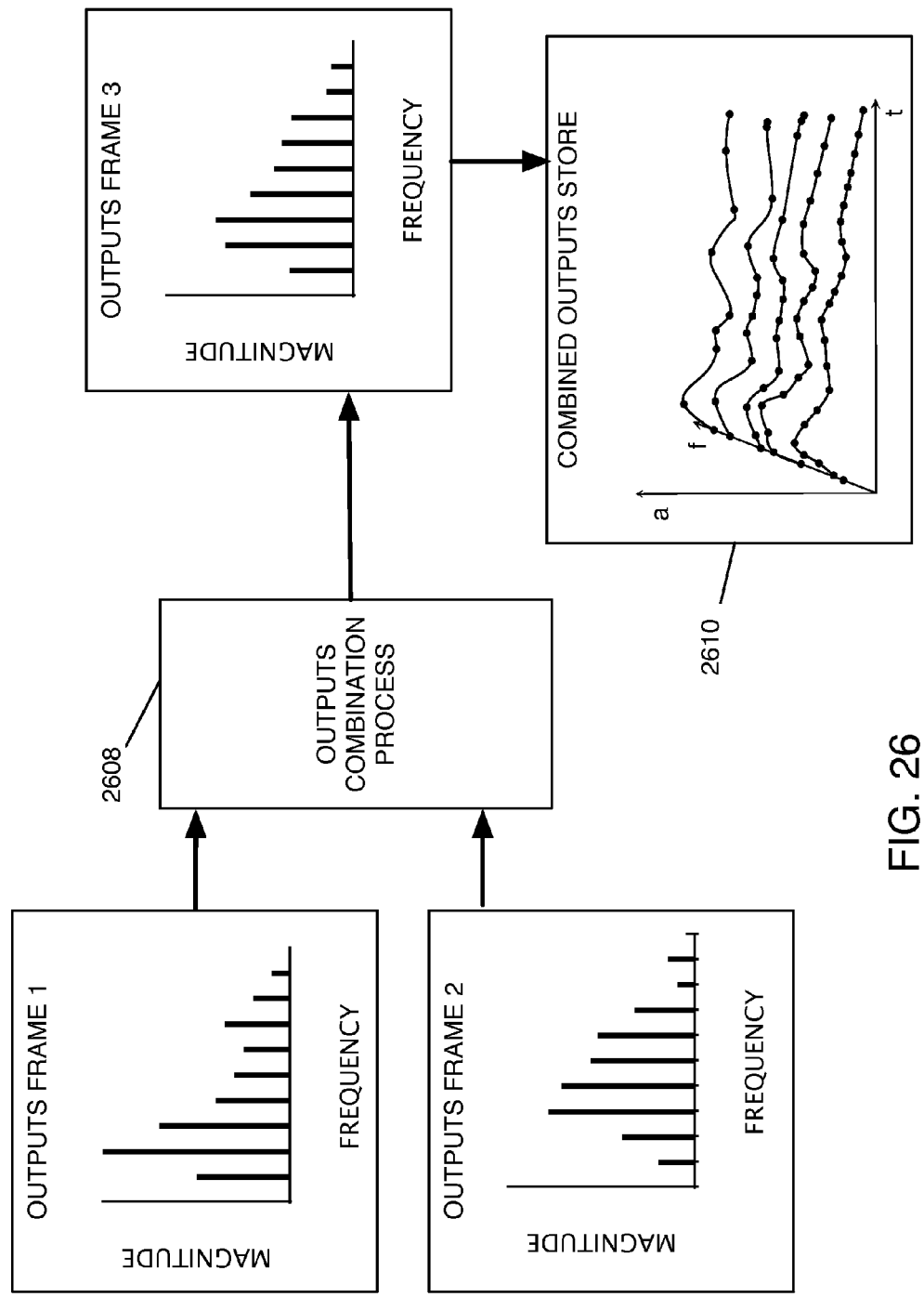
FIG. 26 shows an example of function mapper output combination process.

FIG. 26 is an illustration of an outputs combination process 2608 combining two outputs frames (spectral peaks frames) linearly. If w1 and w2 are the weighting coefficients of the linear combination, w1 can be set to 0.5 and w2 can be set to 0.5 for instance. Other types of output combinations could, for example, include combining two spectral peak frames using the formants of one frame to reshape the first frame (cross-synthesis). Combination processes can occur on sub-parts of output frames. For example, combinations can be performed on only half of the peaks or on a selection of peaks.

Figure 27A:
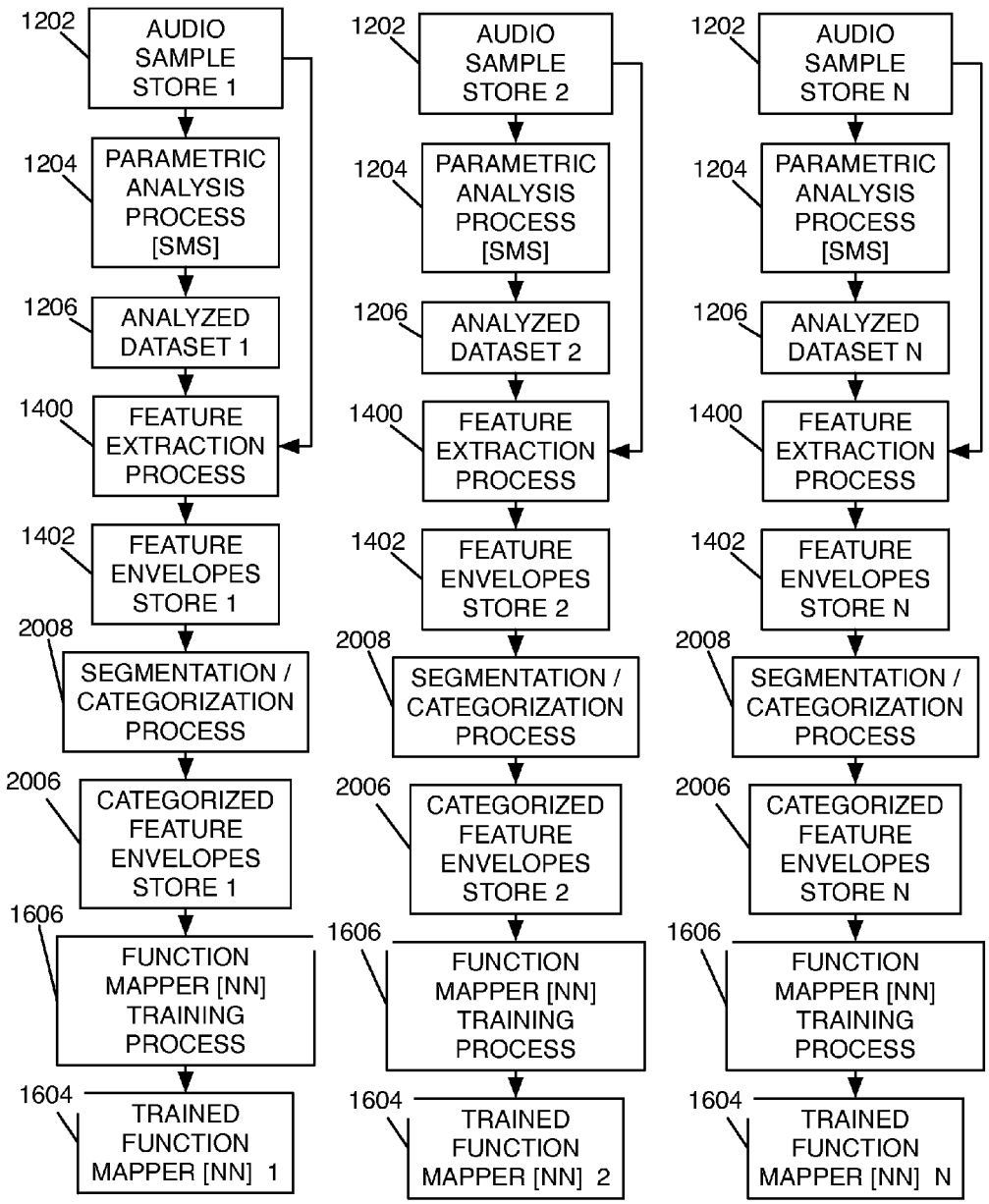
FIG. 27A illustrates the training stage of embodiment #3: combination of two or more segments at the FM's outputs level.

FIG. 27A illustrates the training stage of audio embodiment #3 including the combination of two or more segments at the function mapper's output level. First, record two or more sounds 1202 (e.g., a cow mooing, a saxophone phrase). Next perform parametric analysis 1204 to obtain two or more analyzed datasets 1206. Next perform feature extraction 1400 on all sounds to extract pitch and loudness envelopes for instance. Next perform segmentation/categorization process 2008 on all envelope feature sets to obtain two or more feature envelopes with regions stores 2006. Categorization here can consist in manually or automatically assigning one value for silence region, and a different value for non-silent region. For simplicity we will assume here that each feature envelope store has only one non-silent segment. Automatic silence detection common in the field can be used here.

Next in FIG. 27A train a different Neural Network MLP function mapper 1602 on each different datasets, to map each extracted feature exemplar 1406 to each corresponding analyzed dataset exemplar 1500 according to training process 1606 where the outputs exemplars are spectral peaks amplitudes and obtain a trained function mapper neural network 1606 for each dataset. The training process may use a magnitude-dependent weighting or normalizing function 1700 to give equivalent weights to each value of the analyzed dataset exemplars.

Figure 27B:
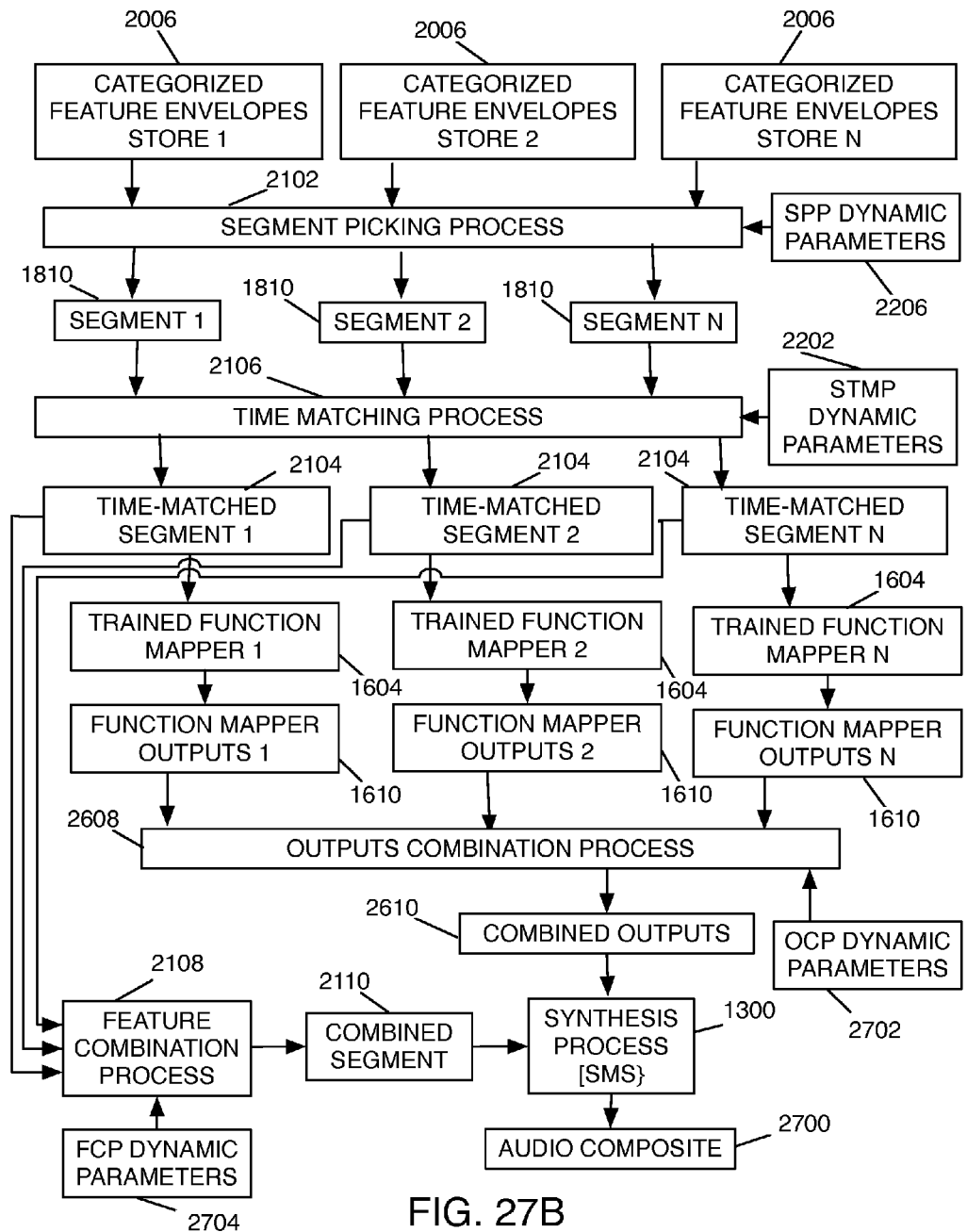
FIG. 27B illustrates the synthesis stage of embodiment #3: combination of two or more segments at the FM's outputs level.

FIG. 27B illustrates the synthesis stage of embodiment #3, similarly as in FIG. 11, including a combination of two or more segments at the function mapper's output level. First, pick 2102 a segment in each feature envelope store. Next perform a time matching process 2106 between all picked segments. Next feed time matched feature envelopes segments 2104 to trained function mappers 1604 in parallel. Next perform output combination process 2608. Next feed combined outputs 2610 to synthesis process. Next get pitch envelopes from each feature envelope store and perform feature combination process 2108. Next feed the combined segment 2110 pitch information to synthesis process 1300 to compute frequencies as harmonics of the combined pitch. Random phases are generated for the first frame and subsequent phases can be computed from frame to frame as is common in the field (for example, assuming linear phases). Spectral peaks amplitudes are given from the outputs of the MLP with a proper de-normalization. It should be noted that the feature combination process dynamic parameters 2704 can match the outputs combination process dynamic parameters 2702.

Finally in FIG. 27B obtain an audio composite 2700. For instance in the case where the original segments are a segment from a cow mooing and a segment a saxophone phrase, the composite could sound like "cow that has swallowed a saxophone." Note that in audio embodiment #3 segments are also combined at input levels (e.g., as in audio embodiment #1).

The audio embodiments presented above enable feeding the segments into the trained function mappers one exemplar at a time while still taking the full segments information such as duration, into account. Furthermore, each process in the chain (i.e., the MLP neural network, the SMS synthesizer etc) can be implemented to work in real-time. Therefore every time a feature envelope exemplar is presented at the input of the chain at synthesis stage, one frame of audio is output at the output. As a result, full segments do not have to be processed before audio is output. The feature combination process 2108 and output combination process 2608 can be performed one exemplar at a time and the combination parameters can be computed or changed in real-time. Since a typical SMS frame rate is of the order of 10-30 ms these changes can happen every 10-30 ms and therefore the changes in the sound can occur in real-time or quasi real-time, making the audio-composite dynamic (e.g., changeable in real-time).

The above-described systems each have a relatively low computational footprint, can run in real time, and can be dynamically modified from one exemplar to the next. For example the feature combination parameters 2204 and 2704, the segment picking parameters (SPP) 2206, the outputs combination process (OCP) parameters 2702, and the segment time matching parameters (STMP) 2202 in FIG. 22B can be dynamically changed. Discriminant input control parameters 2500 in audio embodiment #2 can be dynamically changed as well.

In the audio embodiments presented above, the function mappers have been trained on the magnitudes of spectral peaks only for simplicity but other additional embodiments may train the function mappers on other general parametric representations or on other parts of parametric representations. For example, other embodiments may train the function mappers on the spectral peaks frequency trajectories and/or on the non-deterministic part of the sound as well in order to model sounds that are not purely harmonic such as wind-like sounds. It should be noted that other parametric analysis technique than SMS, and other spectral representations other than short time Fourier transforms can be chosen instead. For example, percussive sounds can be modeled using decaying exponential functions for instance. It should be noted that data from other applications fields such as body motion or image texture can be modeled as well to produce composites movements or composite textures.

Additional Embodiments

Additional embodiments correspond to systems and related computer programs that carry out the above-described methods. For example, a modular apparatus may include specific modules to support training and synthesis stages as discussed above (e.g., a training module and a synthesis module). In this case the apparatus includes at least one computer system (e.g., as in FIG. 28) to perform software and hardware operations for modules that carry out aspects of the above-described methods (e.g., FIGS. 9-11).

Figure 28:
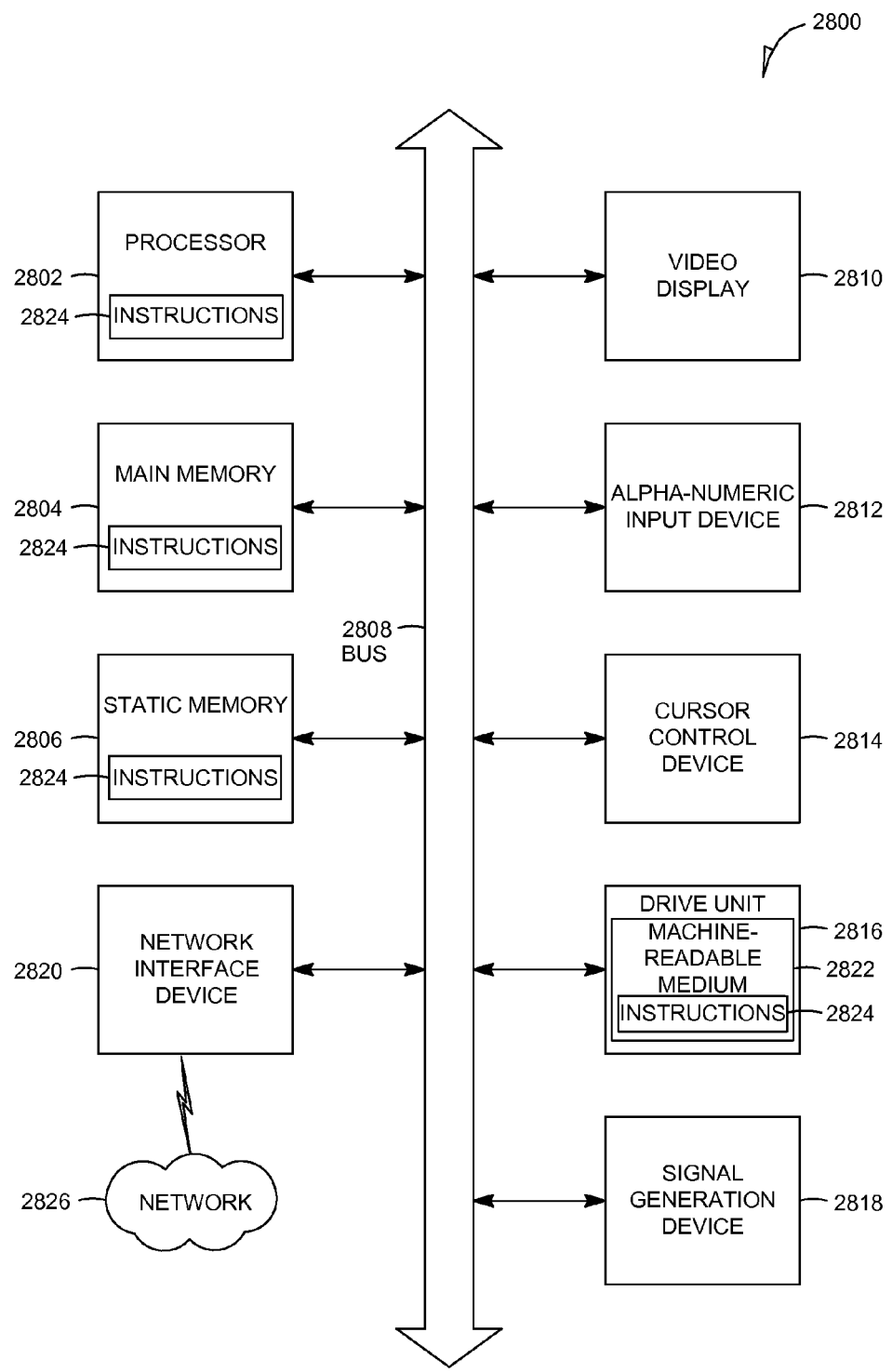
FIG. 28 is a block diagram that shows a computer processing system within which a set of instructions for causing the computer to perform any one of the methodologies discussed herein may be executed.

FIG. 28 shows a machine in the example form of a computer system 2800 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2800 includes a processor 2802 (e.g., a central processing unit (CPU), a graphics processing unit (GPU) or both), a main memory 2804 and a static memory 2806, which communicate with each other via a bus 2808. The computer system 2800 may further include a video display unit 2810 (e.g., a liquid crystal display (LCD) or a cathode ray tube (CRT)). The computer system 2800 also includes an alphanumeric input device 2812 (e.g., a keyboard), a user interface (UI) cursor control device 2814 (e.g., a mouse), a disk drive unit 2816, a signal generation device 2818 (e.g., a speaker) and a network interface device 2820.

In some contexts, a computer-readable medium may be described as a machine-readable medium. The disk drive unit 2816 includes a machine-readable medium 2822 on which is stored one or more sets of data structures and instructions 2824 (e.g., software) embodying or utilizing any one or more of the methodologies or functions described herein. The instructions 2824 may also reside, completely or at least partially, within the static memory 2806, within the main memory 2804, or within the processor 2802 during execution thereof by the computer system 2800, with the static memory 2806, the main memory 2804 and the processor 2802 also constituting machine-readable media.

While the machine-readable medium 2822 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 2824. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 2824 may further be transmitted or received over a communications network 2826 using a transmission medium. The instructions 2824 may be transmitted using the network interface device 2820 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Conclusion

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of producing dynamically controllable data composites from two or more data segments, the method comprising:

training one or more function mappers to map between one or more feature envelopes sets that are extracted from data segments of audio data and one or more corresponding parametric representations of the audio data by using at least one training parameter to discriminate between the data segments in a training process for the one or more function mappers, the one or more feature envelope sets corresponding to one or more perceptual characteristics of the audio data, and the one or more parametric representations corresponding to one or more spectral characteristics of the audio data;

forming a composite data structure by using at least one control parameter to combine values for a plurality of the data segments, each of the plurality of data segments being associated with a corresponding feature envelope set and a corresponding function mapper; and generating synthesis parameters for the composite data structure by feeding the feature envelopes sets corresponding to the composite data structure to the corresponding one or more function mappers and combining outputs of the one or more function mappers in accordance with the composite data structure, the synthesis parameters being used to drive a synthesis process.

2. The method of claim 1, wherein training the one or more function mappers includes combining two or more feature envelope sets at an input level of a first function mapper.

3. The method of claim 1, wherein training the one or more function mappers includes combining two or more feature envelope sets at a body level of a first function mapper by training the first function mapper with a first training parameter that operates as a discriminant input on the two or more feature envelope sets.

4. The method of claim 1, wherein generating the synthesis parameters includes combining values at output levels of a first function mapper and a second function mapper, each of the first and second function mappers being fed with two or more feature envelope sets.

5. An apparatus for producing dynamically controllable data composites from two or more data segments, the apparatus including at least one computer that performs operations for computer-implemented modules including:

a training module for training one or more function mappers to map between one or more feature envelopes sets that are extracted from data segments of audio data and one or more corresponding parametric representations of the audio data by using at least one training parameter to discriminate between the data segments in a training process for the one or more function mappers, the one or more feature envelope sets corresponding to one or more perceptual characteristics of the audio data, and the one or more parametric representations corresponding to one or more spectral characteristics of the audio data;

a data-structure module for forming a composite data structure by using at least one control parameter to combine values for a plurality of the data segments, each of the plurality of data segments being associated with a corresponding feature envelope set and a corresponding function mapper; and a synthesis module for generating synthesis parameters for the composite data structure by feeding the feature envelopes sets corresponding to the composite data structure to the corresponding one or more function mappers and combining outputs of the one or more function mappers in accordance with the composite data structure, the synthesis parameters being used to drive a synthesis process.

6. A non-transitory computer-readable medium that stores a computer program for producing dynamically controllable data composites from two or more data segments, the computer program including instructions that, when executed by a computer, cause the computer to perform operations including:

training one or more function mappers to map between one or more feature envelopes sets that are extracted from data segments of audio data and one or more corresponding parametric representations of the audio data by using at least one training parameter to discriminate between the data segments in a training process for the one or more function mappers, the one or more feature envelope sets corresponding to one or more perceptual characteristics of the audio data, and the one or more parametric representations corresponding to one or more spectral characteristics of the audio data;

forming a composite data structure by using at least one control parameter to combine values for a plurality of the data segments, each of the plurality of data segments being associated with a corresponding feature envelope set and a corresponding function mapper; and generating synthesis parameters for the composite data structure by feeding the feature envelopes sets corresponding to the composite data structure to the corresponding one or more function mappers and combining outputs of the one or more function mappers in accordance with the composite data structure, the synthesis parameters being used to drive a synthesis process.

7. The method of claim 1, wherein the one or more perceptual characteristics of the audio data include at least one of pitch, loudness or brightness.

8. The method of claim 1, wherein the one or more spectral characteristics of the audio data include values for spectral peaks in one or more of the data segments.

9. The method of claim 1, wherein generating the synthesis parameters includes using a first control parameter to interpolate values between output levels of a first function mapper and a second function mapper or to extrapolate values from the output levels of the first function mapper and the second function mapper.

10. The method of claim 1, wherein generating the synthesis parameters includes using a first control parameter to calculate a linear combination of values from the output levels of a first function mapper and a second function mapper.

11. The method of claim 1, wherein the one or more function mappers include at least one neural network that is trained adaptively in the training process for the one or more function mappers.

12. The method of claim 1, wherein the at least one training parameter includes a discriminant input that is used to combine two or more of the data segments in a first function mapper.

13. The method of claim 1, further comprising:
determining boundaries of the data segments in the audio data from changes in perceptual characteristics in the audio data;
associating one or more categories with the data segments, each category corresponding to perceptual descriptor for a corresponding data segment; and
training the one or more function mappers by using the one or more categories in association with the at least one training parameter to discriminate between the data segments.

14. The method of claim 1, further comprising:
providing characteristics of a first segment of the audio data to a user interface;
receiving from the user interface values for a first perceptual descriptor for the first segment;
associating the first perceptual descriptor with the first data segment; and
training a first function mapper by using the first perceptual descriptor in association with a first training parameter to discriminate between the first data segment and other data segments.

15. The apparatus of claim 5, wherein the at least one training parameter includes a discriminant input that is used to combine two or more of the data segments at an input level of a first function mapper.

16. The apparatus of claim 5, wherein the training module is further configured to perform operations including:

determining boundaries of the data segments in the audio data from changes in perceptual characteristics in the audio data;

associating one or more categories with the data segments, each category corresponding to perceptual descriptor for a corresponding data segment; and training the one or more function mappers by using the one or more categories in association with the at least one training parameter to discriminate between the data segments.

17. The apparatus of claim 5, wherein the training module is further configured to perform operations including:

providing characteristics of a first segment of the audio data to a user interface;

receiving from the user interface values for a first perceptual descriptor for the first segment;

associating the first perceptual descriptor with the first data segment; and training a first function mapper by using the first perceptual descriptor in association with a first training parameter to discriminate between the first data segment and other data segments.

18. The non-transitory computer-readable medium of claim 6, wherein training the one or more function mappers includes combining two or more feature envelope sets at an input level of a first function mapper.

19. The non-transitory computer-readable medium of claim 6, wherein training the one or more function mappers includes combining two or more feature envelope sets at a body level of a first function mapper by training the first function mapper with a first training parameter that operates as a discriminant input on the two or more feature envelope sets.

20. The non-transitory computer-readable medium of claim 6, wherein generating the synthesis parameters includes combining values at output levels of a first function mapper and a second function mapper, each of the first and second function mappers being fed with two or more feature envelope sets.

* * * * *